United States Patent
Xin et al.

(10) Patent No.: US 11,845,504 B2
(45) Date of Patent: Dec. 19, 2023

(54) MULITI-MODULAR ALL ELECTRIC VEHICLE SYSTEM

(71) Applicants: Alfred X. Xin, Cincinnati, OH (US); Sherry X. Sun, Cincinnati, OH (US)

(72) Inventors: Alfred X. Xin, Cincinnati, OH (US); Sherry X. Sun, Cincinnati, OH (US)

(73) Assignee: Voltorx Motors Inc.

( * ) Notice: Subject to any disclaimer, the term of this patent is extended or adjusted under 35 U.S.C. 154(b) by 443 days.

(21) Appl. No.: 17/340,026

(22) Filed: Jun. 6, 2021

(65) Prior Publication Data

US 2022/0363328 A1 Nov. 17, 2022

Related U.S. Application Data

(60) Provisional application No. 63/187,650, filed on May 12, 2021.

(51) Int. Cl.
*B62D 63/02* (2006.01)
*B62D 65/04* (2006.01)
*B62D 27/06* (2006.01)

(52) U.S. Cl.
CPC ........... *B62D 63/025* (2013.01); *B62D 65/04* (2013.01); *B62D 27/06* (2013.01)

(58) Field of Classification Search
CPC . B60P 3/42; B60P 3/423; B62D 27/06; B62D 63/025; B62D 65/04
USPC .................................................... 296/193.04
See application file for complete search history.

(56) References Cited

U.S. PATENT DOCUMENTS

| | | | |
|---|---|---|---|
| 3,068,038 A | 5/1960 | Douglass, Jr. | |
| 4,368,793 A | 1/1983 | Igarashi | |
| 4,422,685 A * | 12/1983 | Bonfilio | B62D 65/04 296/193.04 |
| 4,676,545 A * | 6/1987 | Bonfilio | B62D 29/046 440/90 |
| 5,301,997 A | 4/1994 | Cudden | |
| 8,727,426 B2 * | 5/2014 | Vitale | B62D 63/025 296/193.04 |
| 9,227,675 B1 | 1/2016 | Elquest | |
| 11,702,162 B2 * | 7/2023 | Harmon | B60K 1/00 296/193.04 |
| 2017/0203801 A1 | 7/2017 | Hung | |
| 2017/0334278 A1 | 11/2017 | Yamamoto | |
| 2018/0022405 A1 | 1/2018 | Gecchelin | |

(Continued)

*Primary Examiner* — Jason S Daniels

(57) ABSTRACT

An invented all electric powered multi-modular vehicle system consists of a driving module and different types of non-driving vehicle modules, such as enhanced capacity module for more passengers, sports utility module, a truck-bed module, a recreational vehicle module, four-wheel-drive module and cargo truck module etc. When given a command the vehicle modules shall be automatically configured into one vehicle or detached back to individual vehicle modules as commanded. The entire coupling and configuration and decoupling and deconfiguration may be operated with a wireless user device. The modular vehicle system offers users with different options over capacities and functions, as well as cost-saving and more efficient vehicle utilization rate. Vehicle owners may buy a particular set of modules while rent or lease or exchange other non-driving modules via vehicle rental service or a media network connecting owners of the modular vehicles when needed.

21 Claims, 26 Drawing Sheets

(56) References Cited

U.S. PATENT DOCUMENTS

Figure 1:
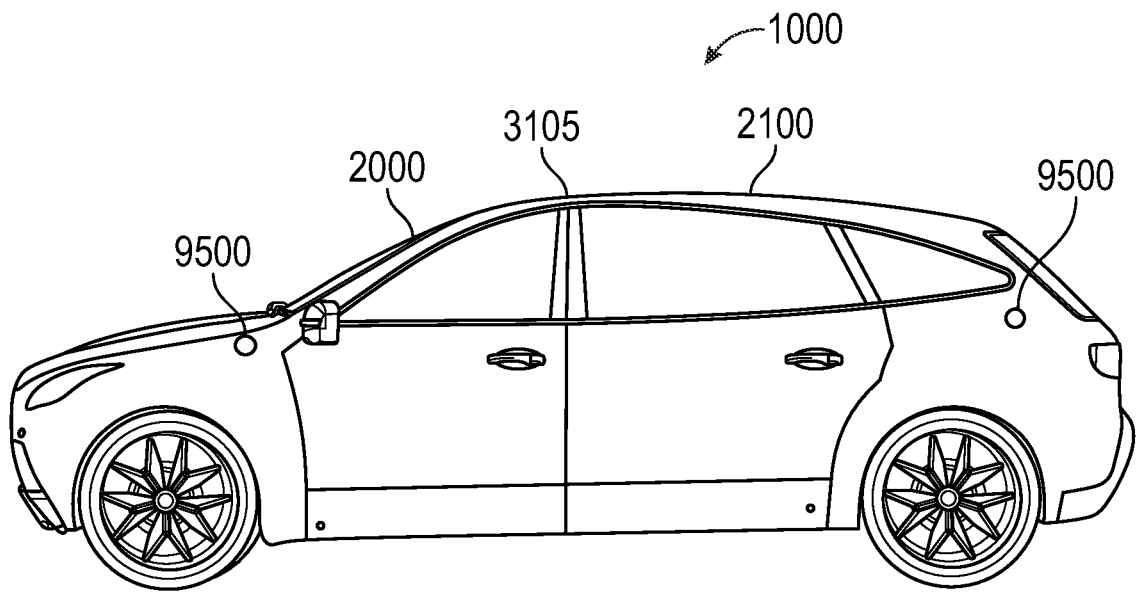

2018/0050626 A1\* 2/2018 Delp .................. B60L 50/60
2020/0062097 A1   2/2020 Hara
2023/0242195 A1\* 8/2023 Beals .................. B62D 25/08
                                                180/65.1

\* cited by examiner

MULITI-MODULAR ALL ELECTRIC VEHICLE SYSTEM

PRIORITY UNDER 35 U.S.C. SECTION 119(E) & 37 C.F.R. SECTION 1.78

This non-provisional application is continuation of and claims the benefits of U.S. provisional application Ser. No. 63/187,650 filed on May 12, 2021, U.S. provisional application Ser. No. 63/118,953 filed on Nov. 29, 2020. US provisional application Ser. No. 63/077,622 filed on Sep. 12, 2020, the entireties of which are incorporated herein by reference.

FIELD OF THE INVENTION

The present invention relates to modular electric vehicles, more particularly but not by way of limitation, a multi-modular electric vehicle system that provides vehicle modules with a plurality of capacities and functions that may be actively coupled and configured into different types of vehicles based on demands.

BACKGROUND

Vehicles are designed with predefined functions and capacities, when users need a vehicle, they buy a vehicle with defined function and capacity. When users may need to have different vehicles for different purposes and capacities, majority of users would have to decide what vehicle type that they would utilize most often and then would acquire that vehicle type. It is not feasible and not cost effective to acquire all types of vehicles with different functions and. Currently designing modular vehicles is mostly designed to benefit manufacturers for standardizing production lines in order to simplify production procedures and save costs. Many vehicle types employ common components such a chassis structure with some being able to change in lengths so as to be used to assemble different models and structures of vehicles.

It would be greatly beneficial if a modular vehicle system could be provided to users so as to offer vehicle modules with different capacities and functions and further be able to configure and couple these modules into different vehicles as an alternative solution for owning multiple vehicles.

The era of electric vehicle has made it possible, and the core components thereof can be leveraged to create a platform for the present invention. All electric vehicles ("AEV") have different components and structure than gasoline powered vehicles such as but not limitation all electric vehicles have no gas tank, an alternate style of power train and no exhaust system. The aforementioned elements found on conventional gasoline vehicles make re-configuration thereof impossible due to the layout of those elements. Alternatively, the chassis structure on an electric vehicle is flat and mostly used to install batteries. General speaking the front section of the vehicle has the operational components such as but not limited to mechanical and computerized control systems, dashboard and climate control systems, and further AI (artificial intelligence) software and majority of IP (Intellectual Property) related costs are also concentrated within this part of the vehicles. Components and structural costs for front section of an all-electric vehicle is approximately seventy percent for the aforementioned with the remaining portion of the vehicle comprising about thirty percent of the entire costs to build the vehicle.

An all-electric vehicle could employ a model having a front section of a vehicle and a rear section of the vehicle wherein the front section would be a driving module having all of the operational components required to operate the vehicle and the rear section of a vehicle, a non-driving module would be releasably secured thereto. Alternate styles of rear sections could be provided so as to allow a user to have a vehicle wherein the vehicle includes alternate interchangeable rear sections in order to provide a different function for the vehicle as needed. The invented modular vehicle system may also enable light commercial fleet and parcel delivery vehicles load, swap and drop ship like semi-trucks, eliminating vehicle loading and idling time, and substantially cutting off shipping and delivery turnover time, and significantly reducing equipment, labor, and operational costs. Additionally, modular vehicles as contemplated within the scope of the present invention may also help to reduce energy consumption during the manufacturing process of making the vehicles, and further reduce the quantity of vehicles utilized overall by society which would assist in green objectives targeted towards saving the environment and natural resources as global populations continue to increase.

SUMMARY OF THE INVENTION

It is the object of the present invention to provide an electrically operated modular vehicle having a first module and a second module releasably secured thereto wherein the first module is an operational module, a driving module or "a head", having all the required components to provide operation of the electrically operated vehicle.

Another object of the present invention is to provide a vehicle wherein the vehicle is comprised of two modules that are releasably secured wherein the second module, a non-driving module or "a tail", of the present invention is provided in various styles so as to achieve alternate functions.

Still another object of the present invention to provide an electrically operated modular vehicle having a first module and a second module releasably secured thereto wherein the first module includes vehicle control functions and a motor and power supply operably coupled thereto.

A further object of the present invention is to provide a vehicle wherein the vehicle is comprised of two modules that are releasably secured wherein the first module includes a retractable single wheel installed on rear section of the module in addition to the two conventional wheels and tires assemblies on front-end section of the vehicle. The retractable single wheel is retracted into its housing compartment when the first and second modules are coupled and ready to operate as one vehicle.

Another object of the present invention to provide an electrically operated modular vehicle having a first module and a second module releasably secured thereto wherein the first module and second module have independent and adjustable suspension components.

Still another object of the present invention to provide an electrically operated modular vehicle having a first module and a second module releasably secured wherein the second module has at least two wheels installed at rear section of the module and retractable and adjustable parking support structures installed at front-end section of the second module and the retractable and adjustable parking support structures are retracted into their housing compartment when the first and second modules are coupled and ready to operate as one vehicle.

Yet an additional object of the present invention is to provide a vehicle wherein the vehicle is comprised of two modules that are releasably secured wherein some types of the second module include a retractable door or a removable door installed at frontend of the second modules that is deployed when the second module is not operably coupled to the first module, and some other types of second modules having a wall covering the frontend of the second modules.

A further object of the present invention is to provide an electrically operated modular vehicle having a first module and a second module releasably secured thereto wherein the present invention includes an automated vehicle coupling and configuration system to facilitate the operable coupling of the first module to a second module.

Still a further object of the present invention is to provide a monitoring system having sensors and or cameras installed on the first module and configured with the automated vehicle coupling and configuration system and having sensors and or cameras installed on the second module communicating with the automated vehicle coupling and configuration system, and the monitoring system sends signals and or images about positions and status of modules in coupling process, as well as ground and also surrounding conditions to the automated vehicle coupling and configuration system to assist the coupling and configuration process, as while as monitoring safety situations within vehicle coupling area.

Further the automated vehicle coupling and configuration system on the first module configured to command the retractable single wheel on the first module and the independent adjustable suspensions on first and second modules and parking support structure on the second module operably aligning, leveling, and lining up the first and second modules so as to accurately connect chassis and body couplers on the first and second modules.

And further for the purpose of recoupling procedures the automated vehicle coupling and configuration system is configured to command the first and second modules for decoupling procedures only when the ground leveling condition is within an allowed adjustable range of the independent and adjustable suspensions on the first and second modules and within an allowed adjustable range of the retractable and adjustable parking support structure on the second module.

Still a further object of the present invention is to provide sensors and or cameras installed on the first and second modules and configured with the vehicle operation and control system, and said vehicle operation and control system receives signals and or images on road conditions from said sensors and or cameras, and further said vehicle operation and control system sends commands to operably adjust positions of the adjustable independent suspensions on the first and second modules for safety and smoothness of the vehicle operation:

And yet still further since the second modules, the non-driving modules, vary in sizes and weights, center of the vehicle balance also varies when first module and second modules are coupled, said vehicle operation and control system is configured to send commands and operably adjust the independent adjustable suspensions on the first and second modules according to different center of the vehicle balance when receives signals on road conditions from said sensors and or cameras for safety and smoothness of the vehicle operation.

A further object of the present invention is to provide an electric and electronic coupling system for coupling and connecting electricity wirings and electronic communications between the first module and second module at the time when the first module and second module are coupled.

Still further object of the present invention is to provide batteries installed on the first and second modules and operably and coordinately controlled by electric supply systems of the vehicle modules.

An additional object of the present invention is to provide a vehicle wherein the vehicle is comprised of two modules that are releasably secured wherein the second module can further include an additional motor operably controlled by said vehicle operation and control system.

Still another object of the present invention further include that said coupling and configuration controller being operably configured to receive commands from a user device wherein the user device is communicably coupled to the coupling and configuration controller via a wireless communication protocol.

Still a further object of the present invention is that said driving module and said non-driving module include a digital identification.

Yet another object of the invention is further to provide an authorization code assigned vehicle modules so as to allow a driving module and a non-driving module to couple and configurate.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF TIE DRAWINGS

Figure 2:
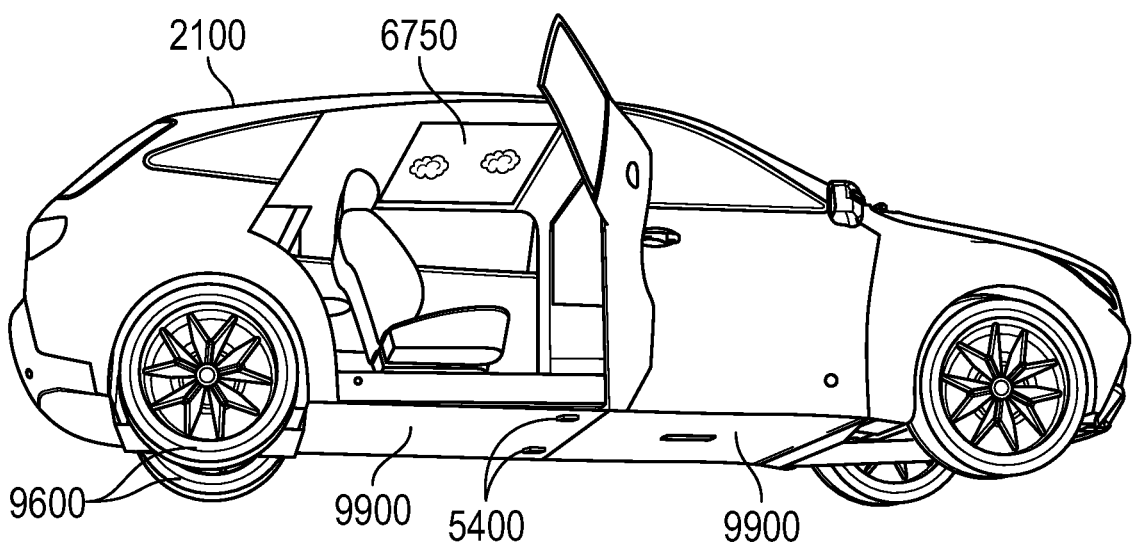
Figure 3A:
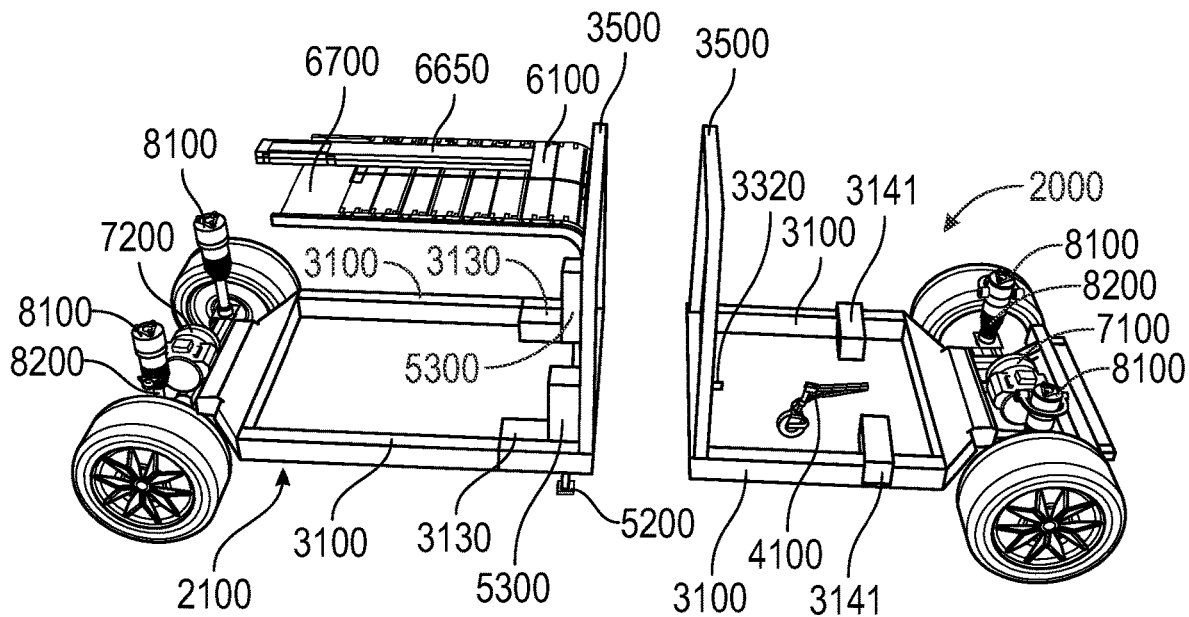
Figure 3B:
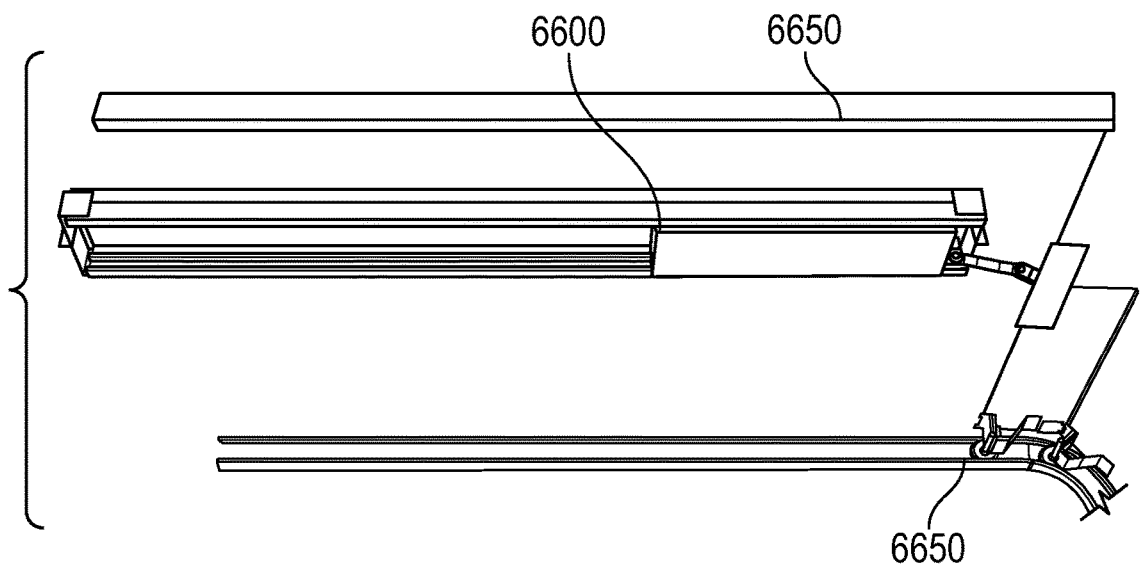
Figure 4:
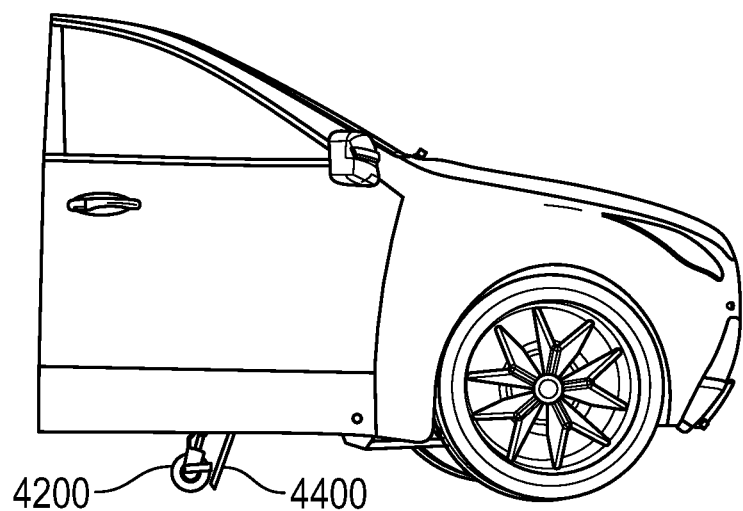
Figure 5:
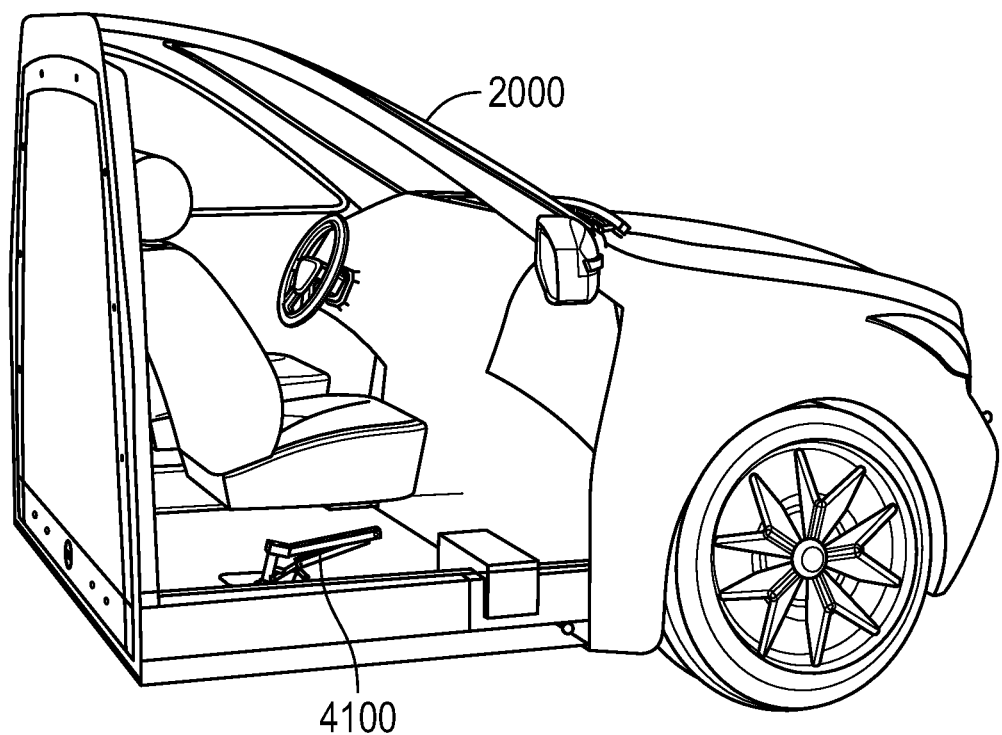
Figure 6:
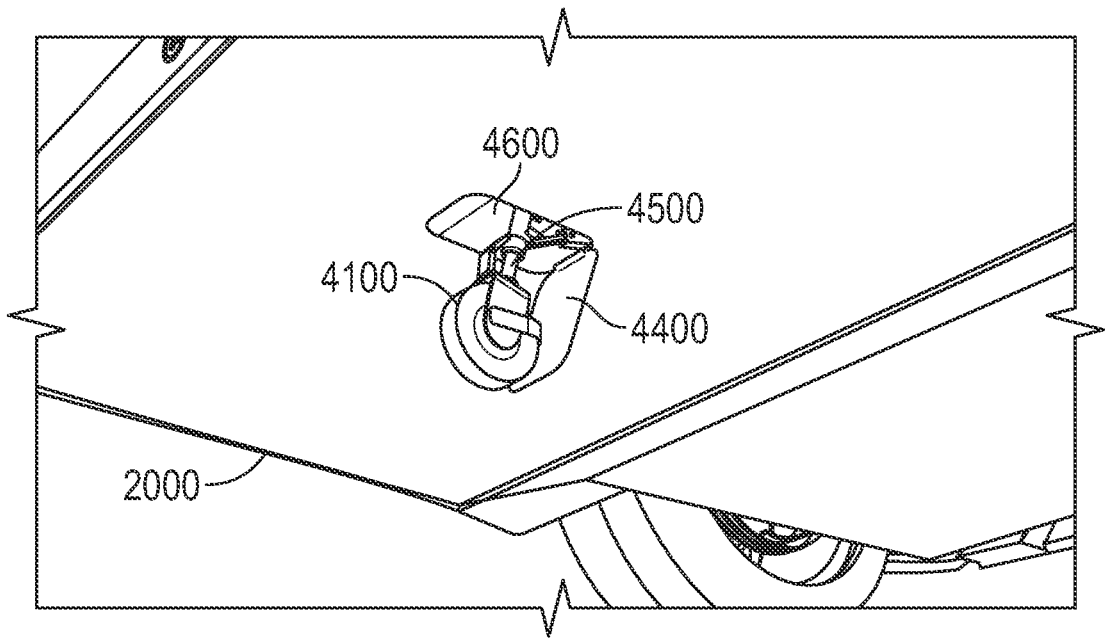
Figure 7:
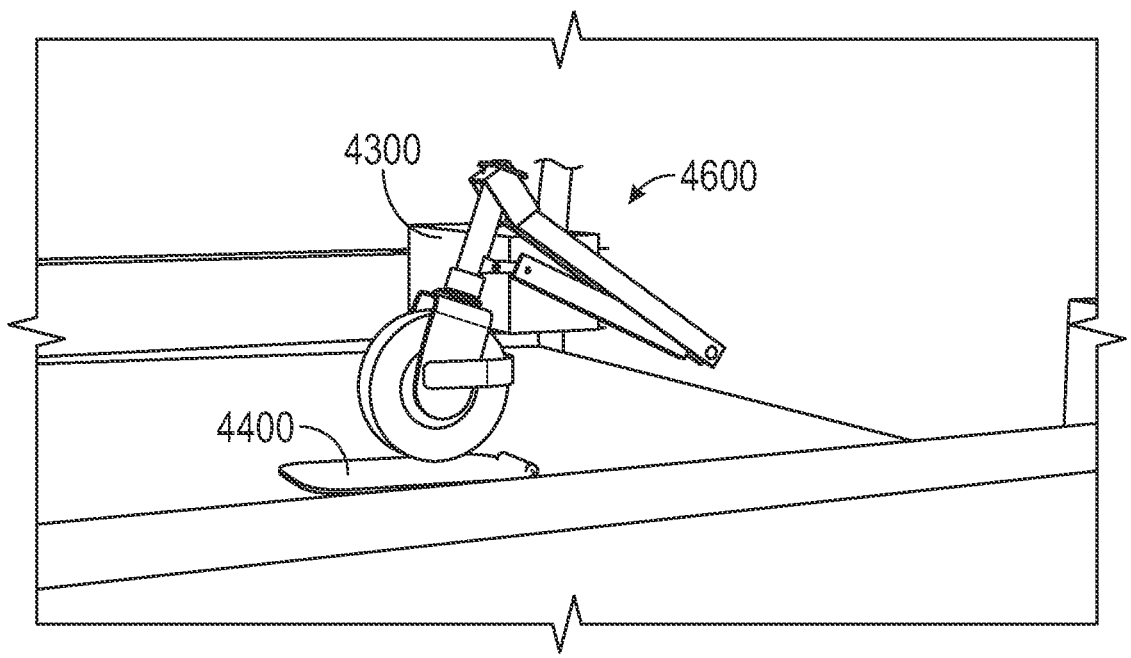
Figure 8:
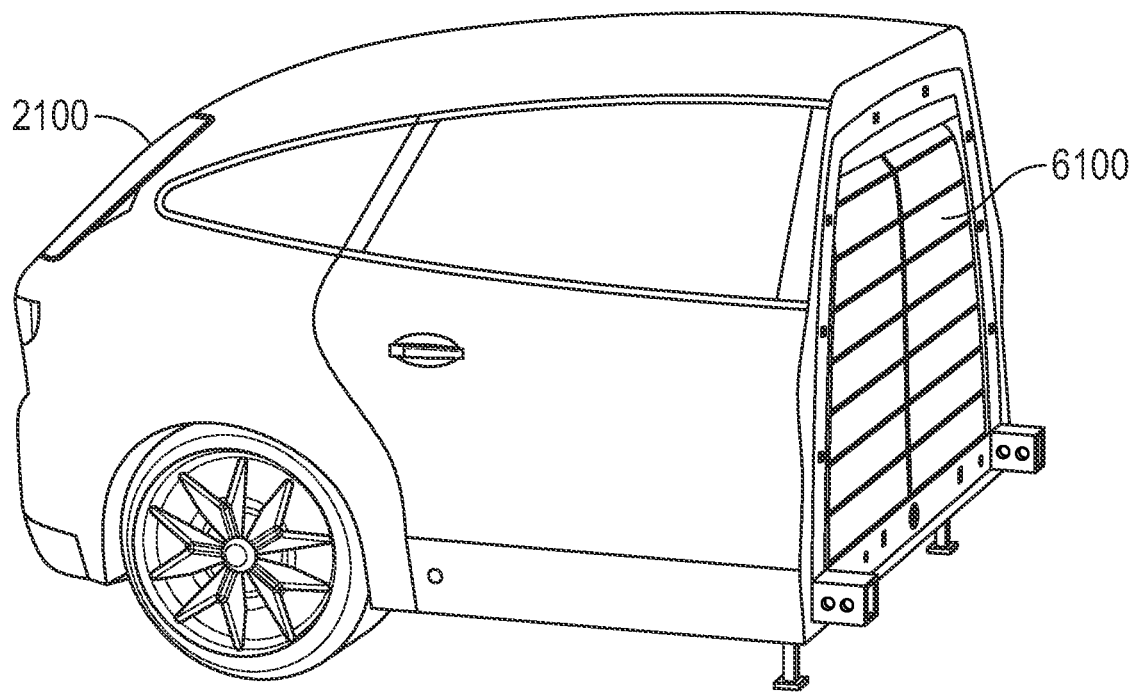
Figure 9:
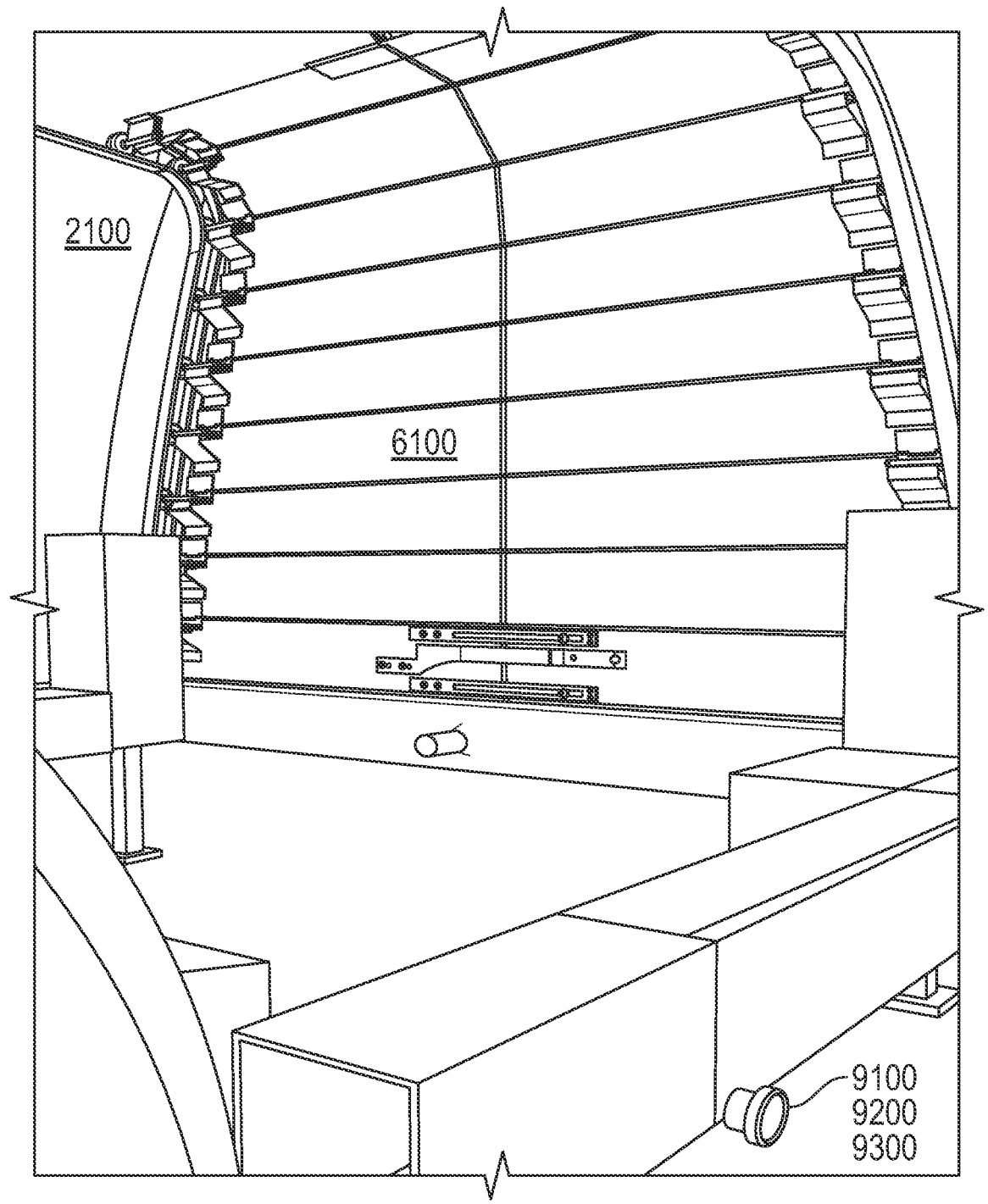
Figure 10:
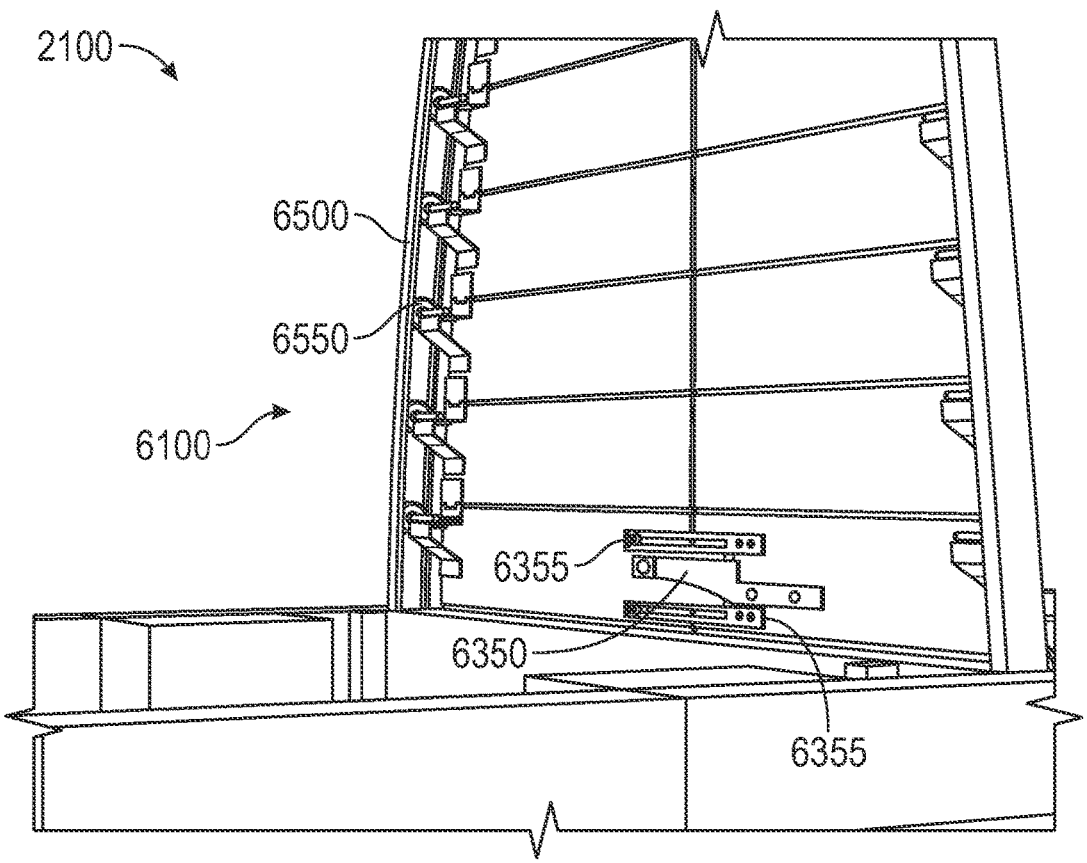
Figure 11:
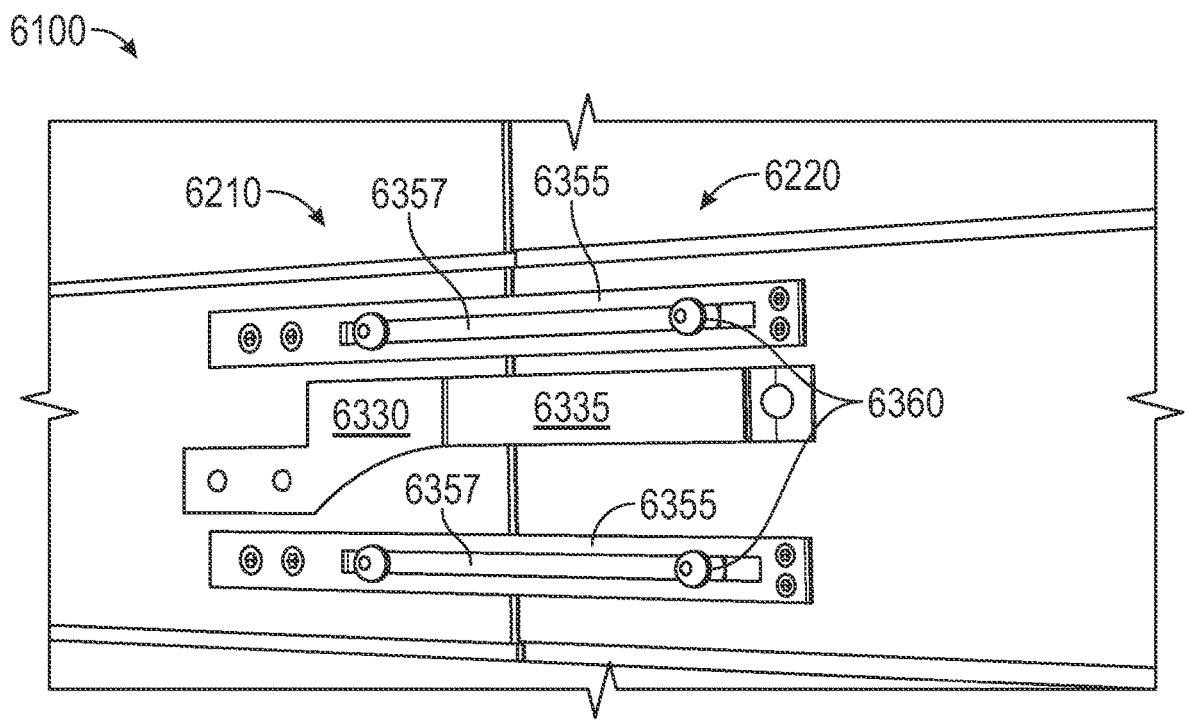
Figure 12:
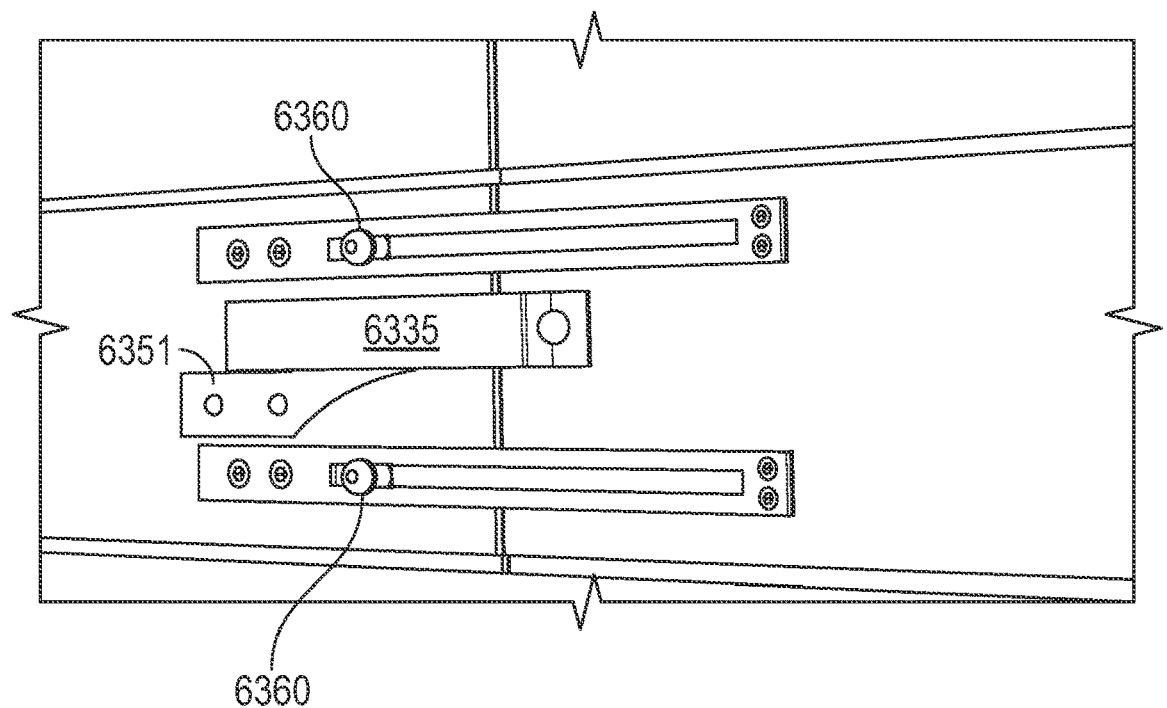
Figure 13:
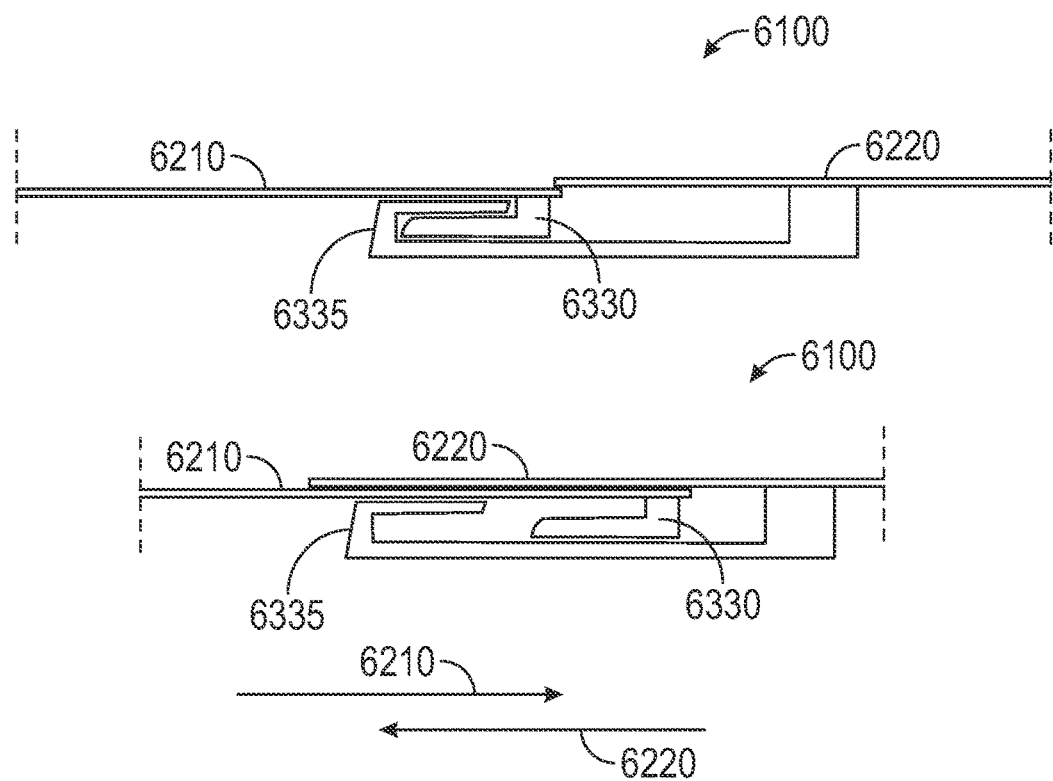
Figure 14:
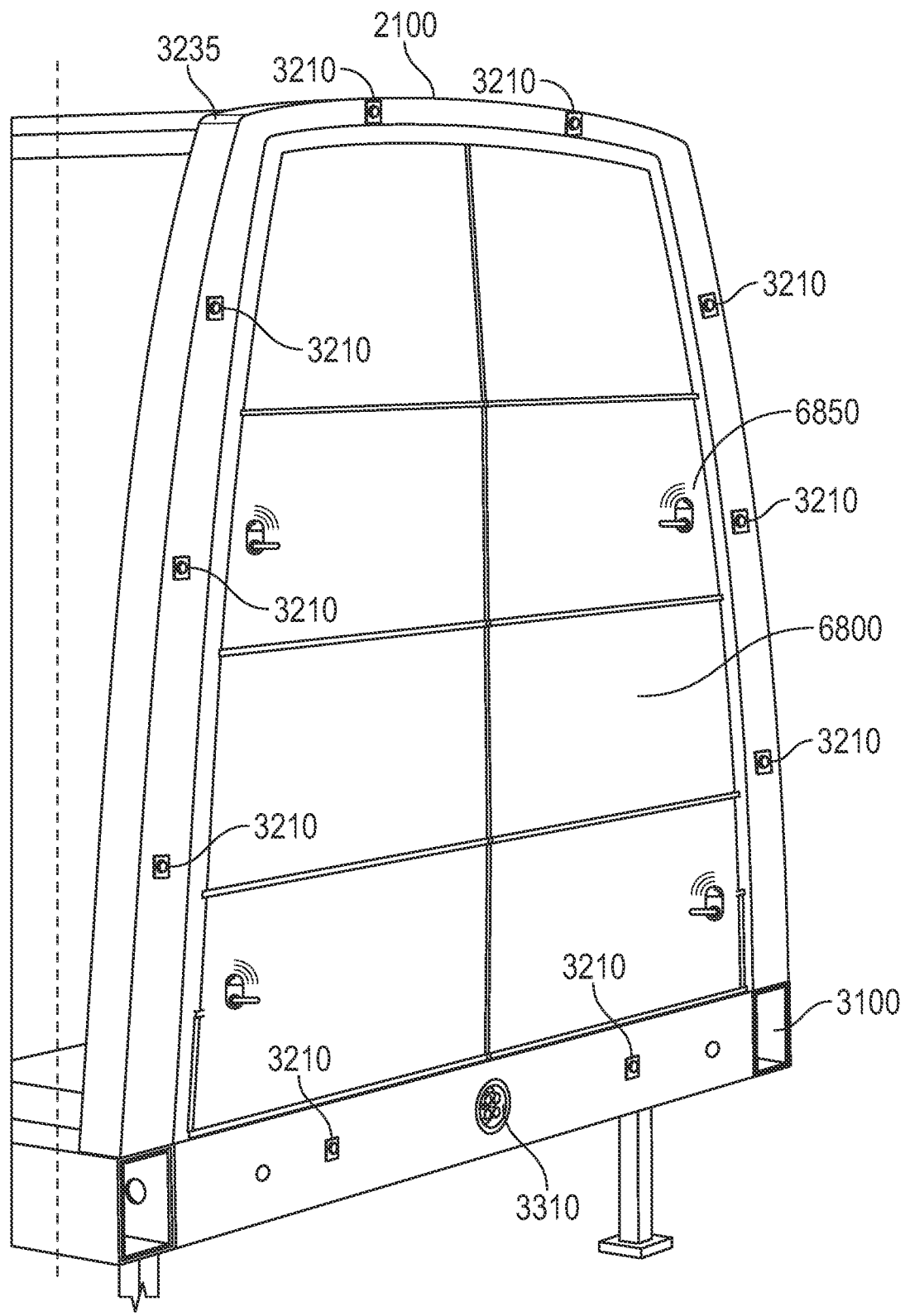
Figure 15:
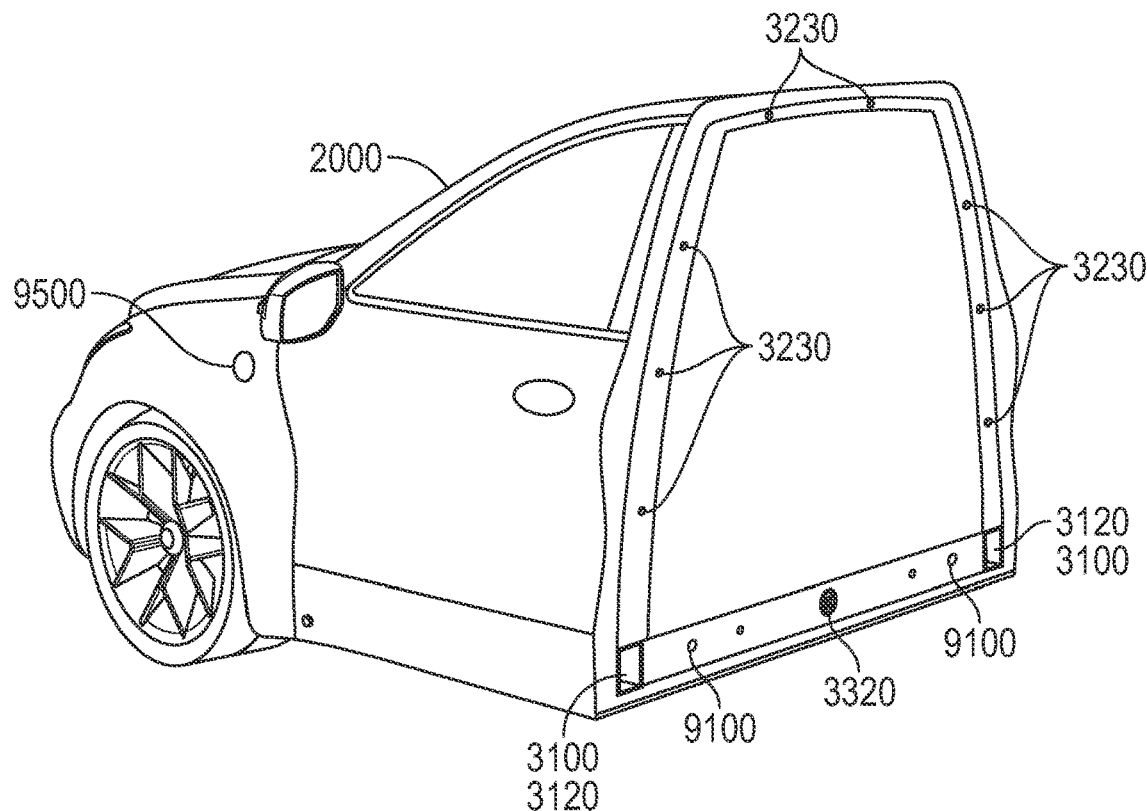
Figure 16:
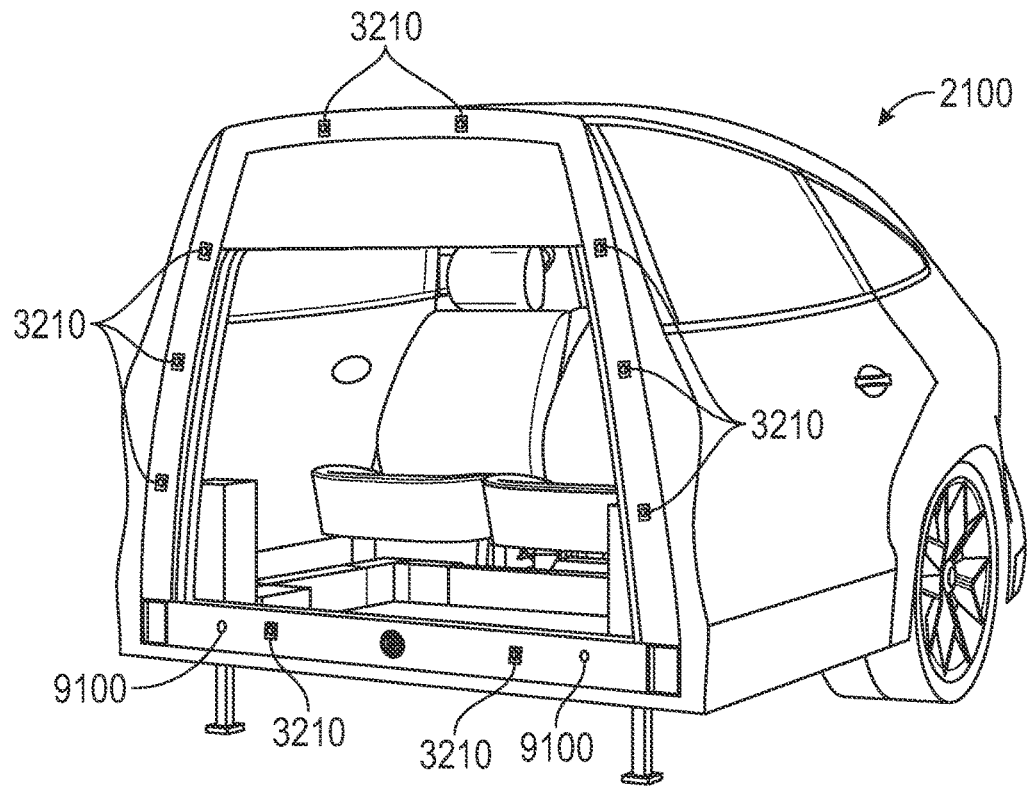
Figure 17:
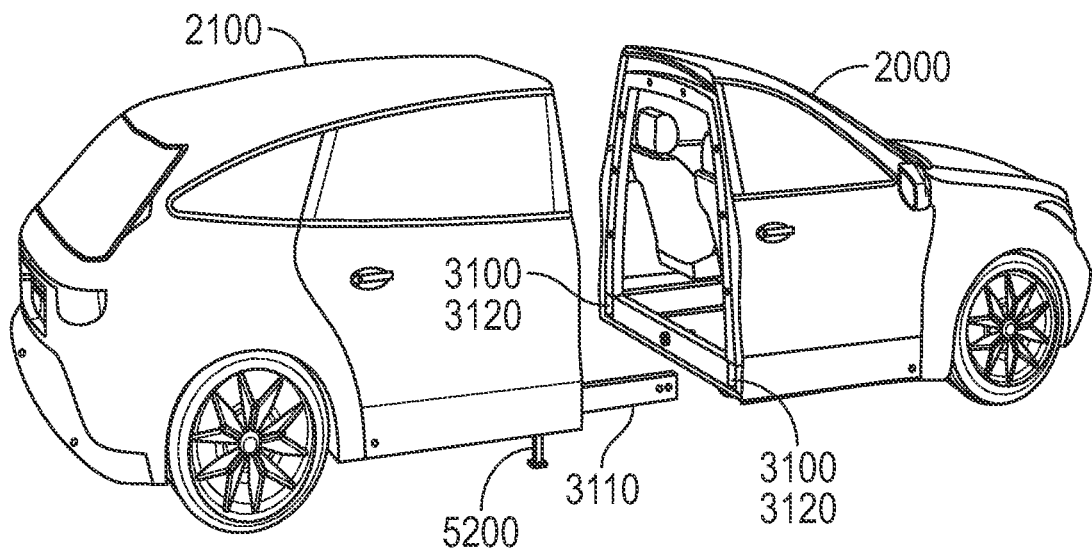
Figure 18:
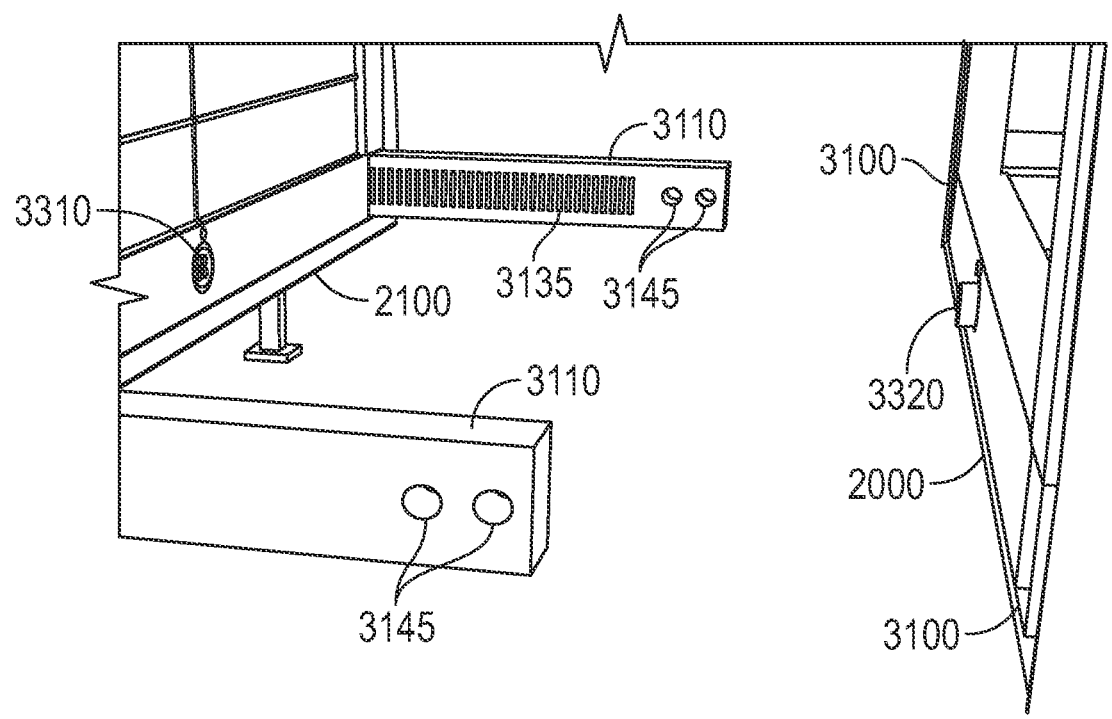
Figure 19:
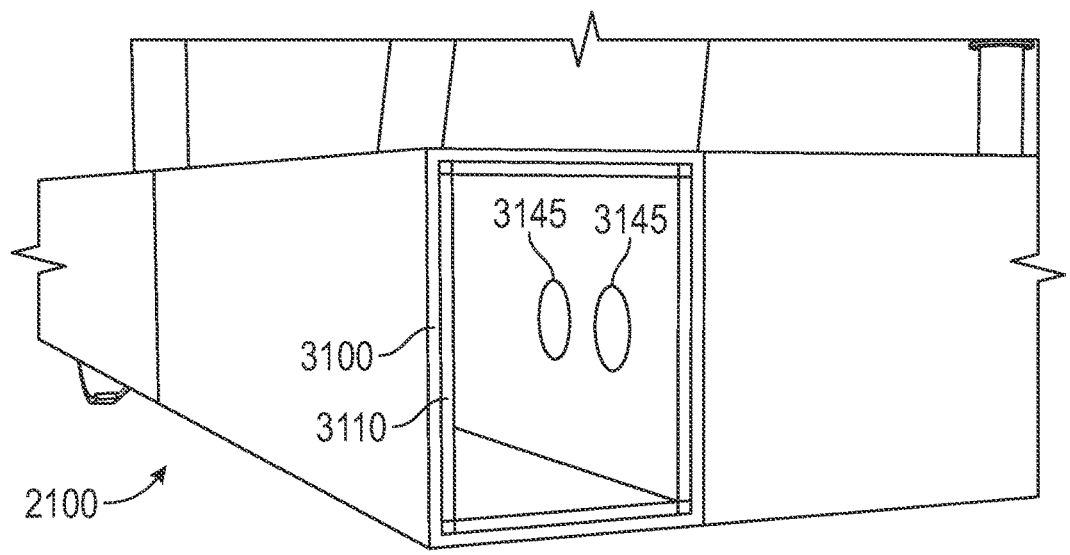
Figure 20:
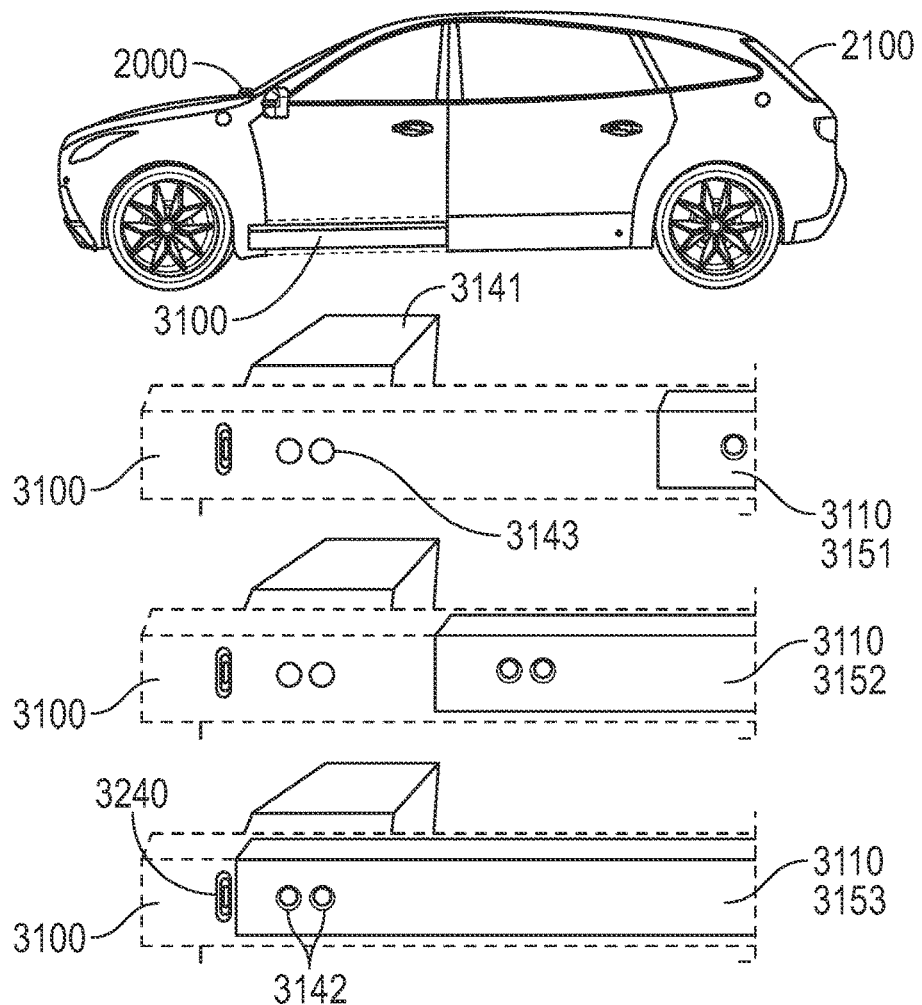
Figure 21:
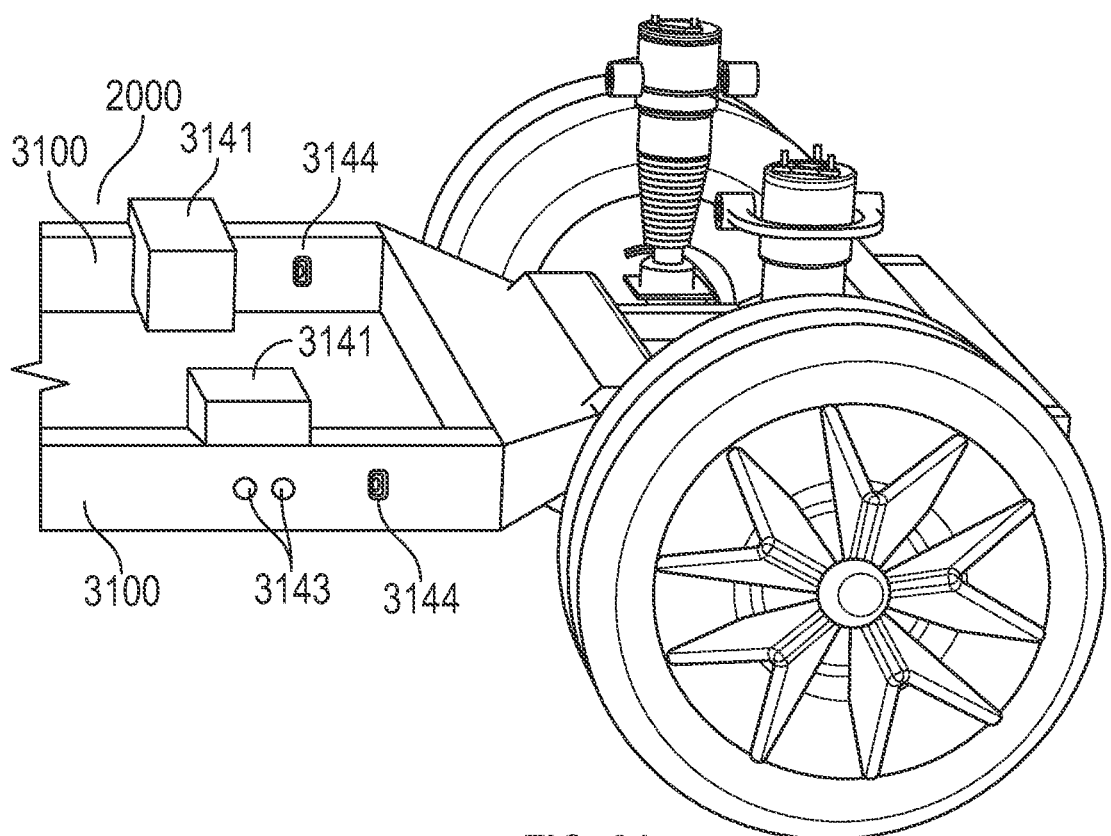
Figure 22:
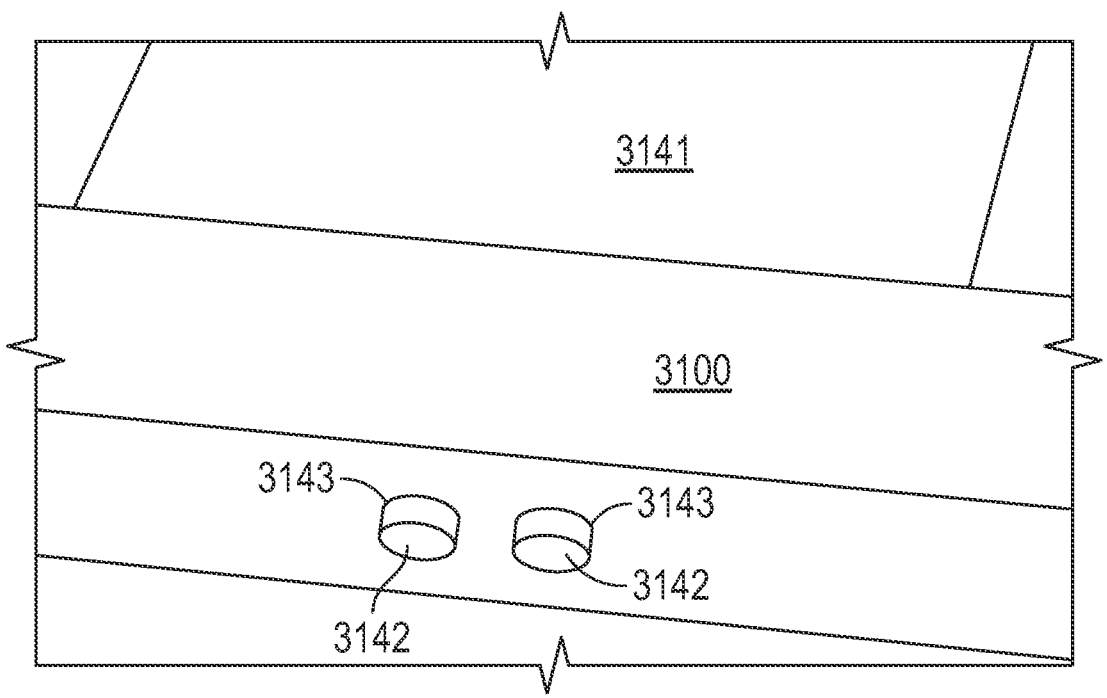
Figure 23:
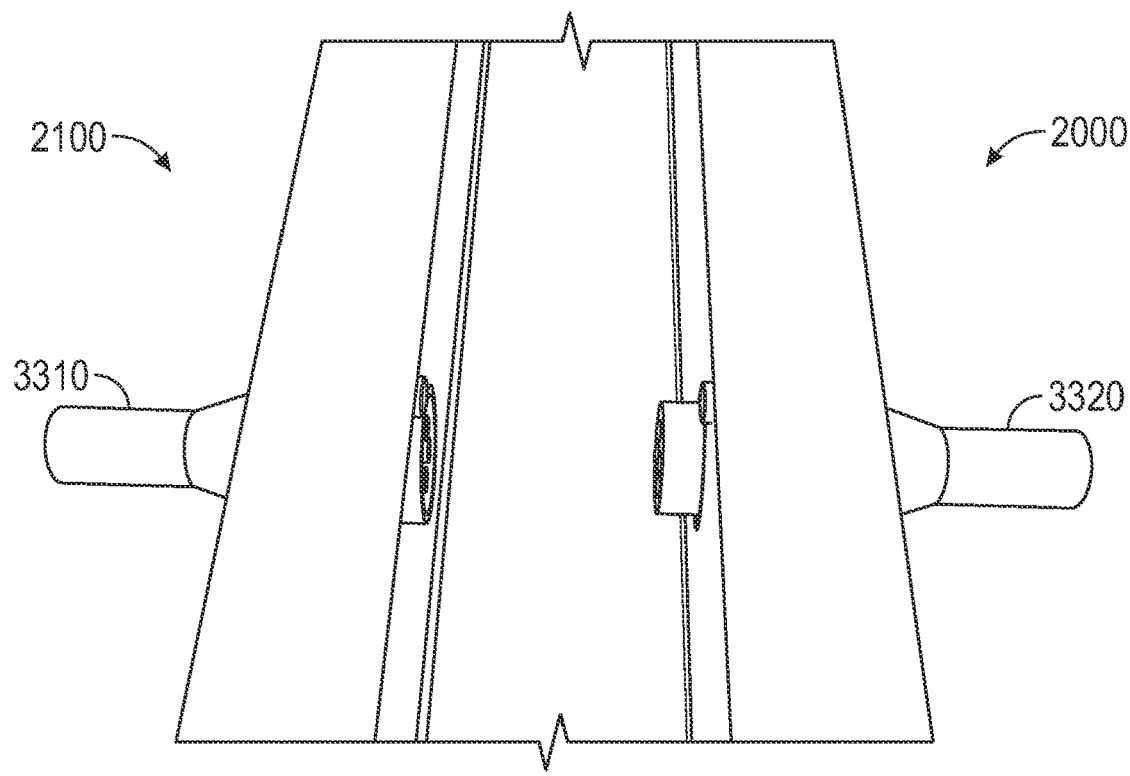
Figure 24:
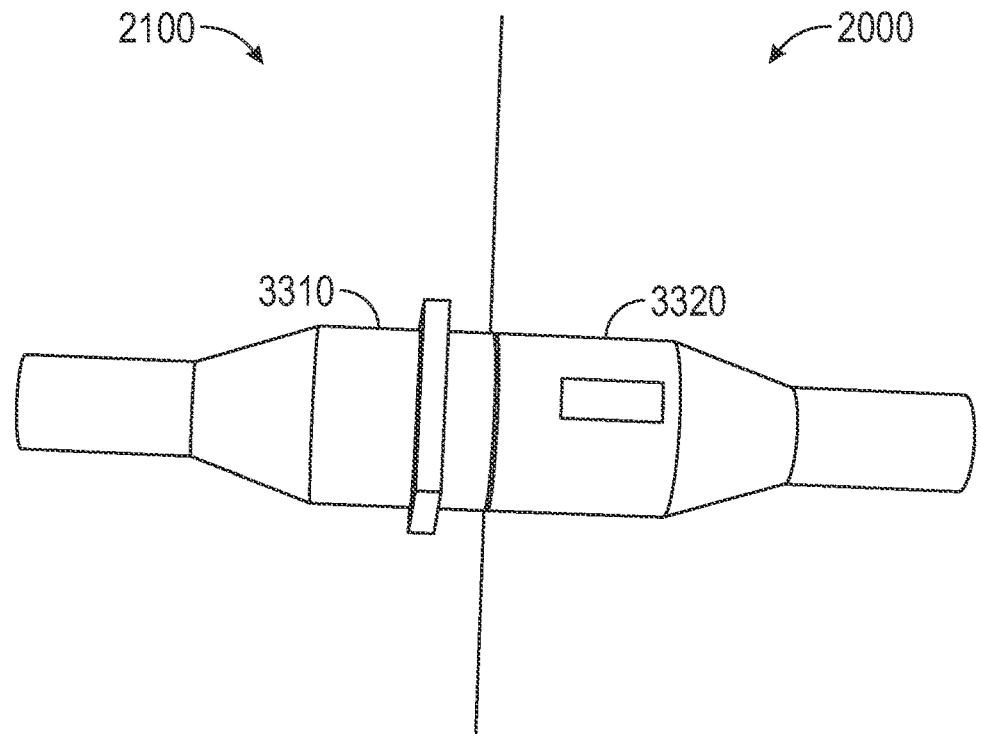
Figure 25:
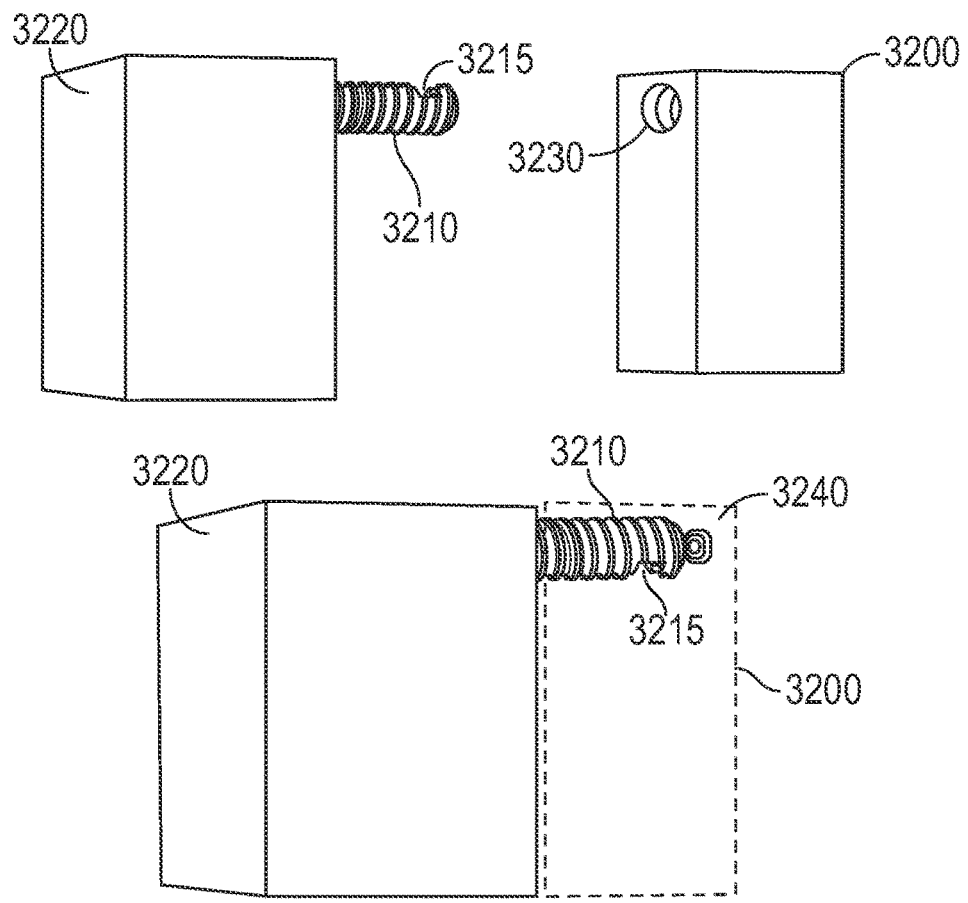
Figure 26:
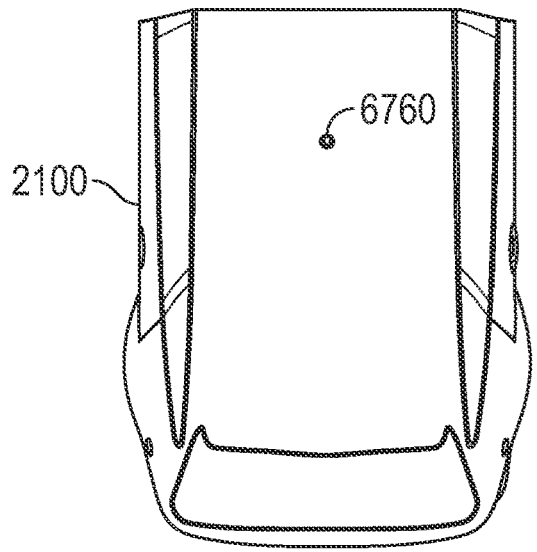
Figure 27:
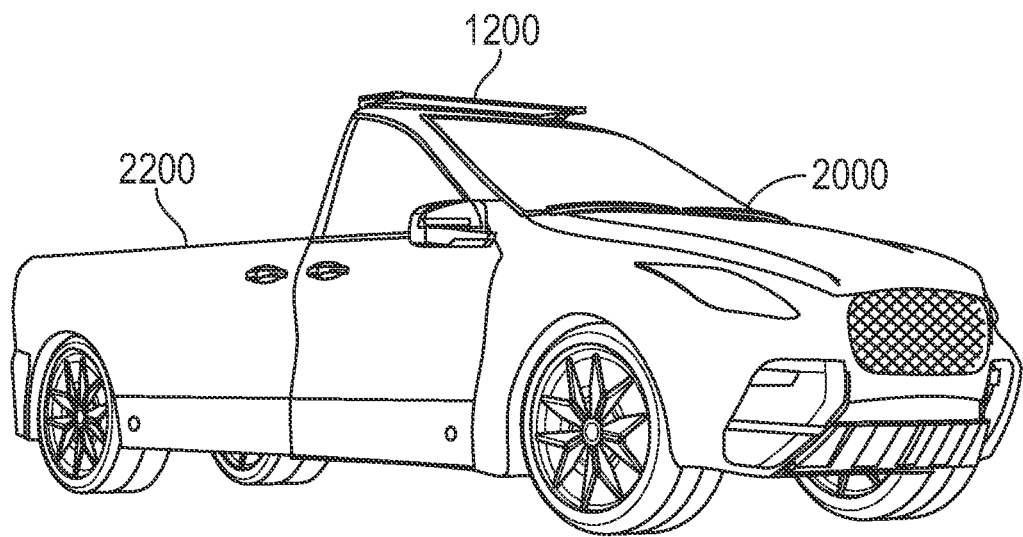
Figure 28:
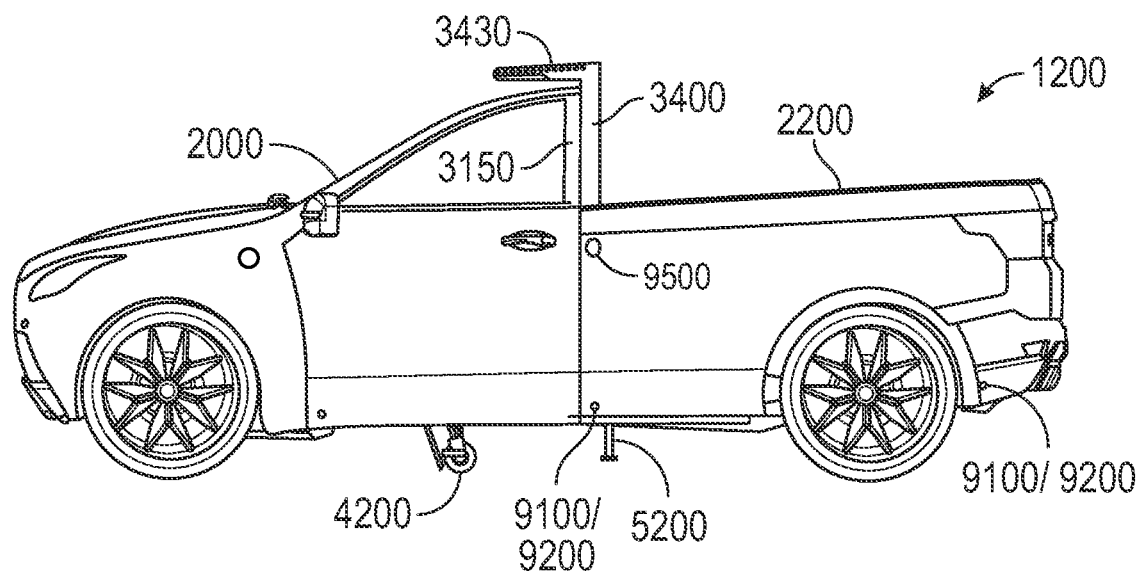
Figure 29:
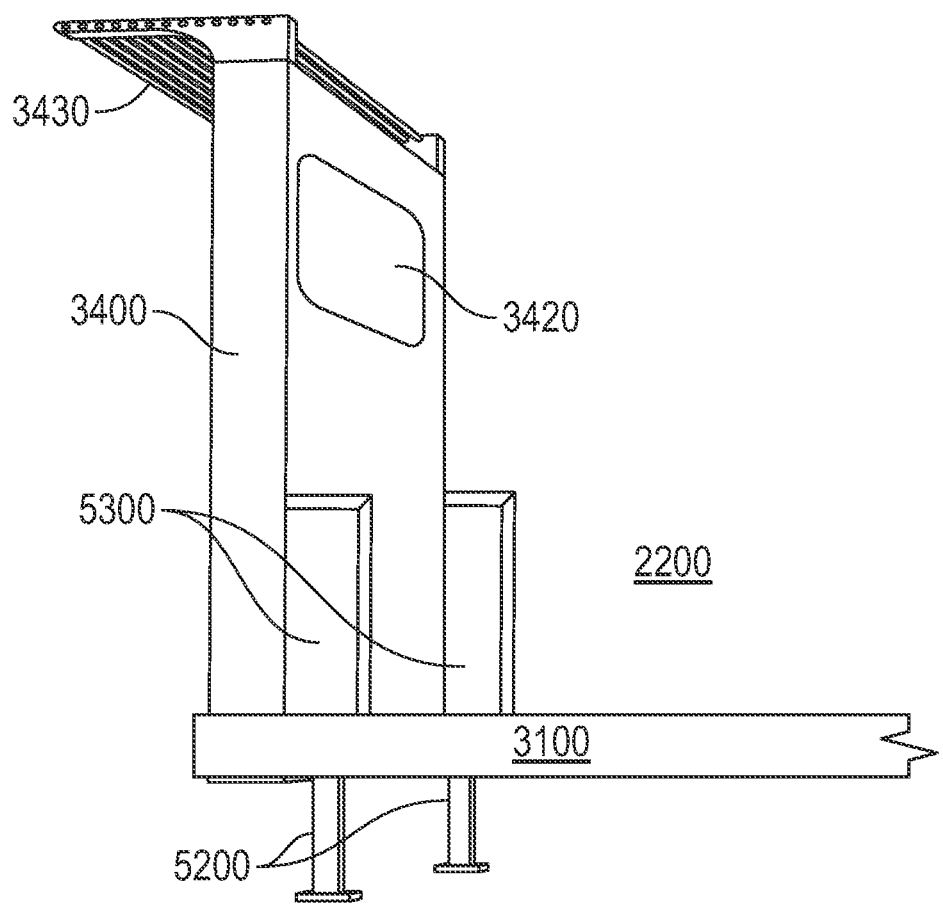
Figure 30:
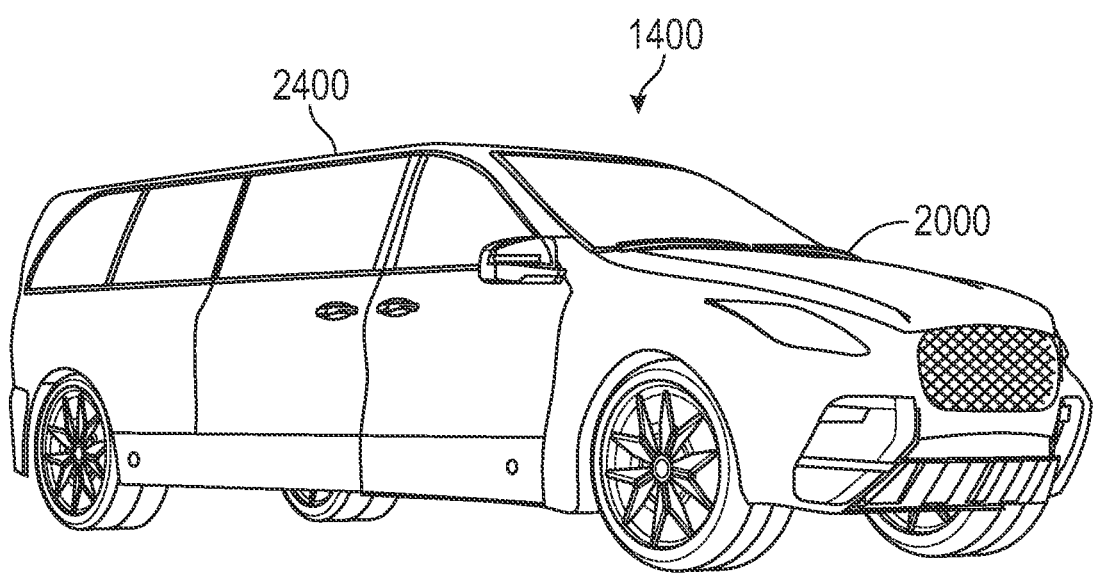
Figure 31:
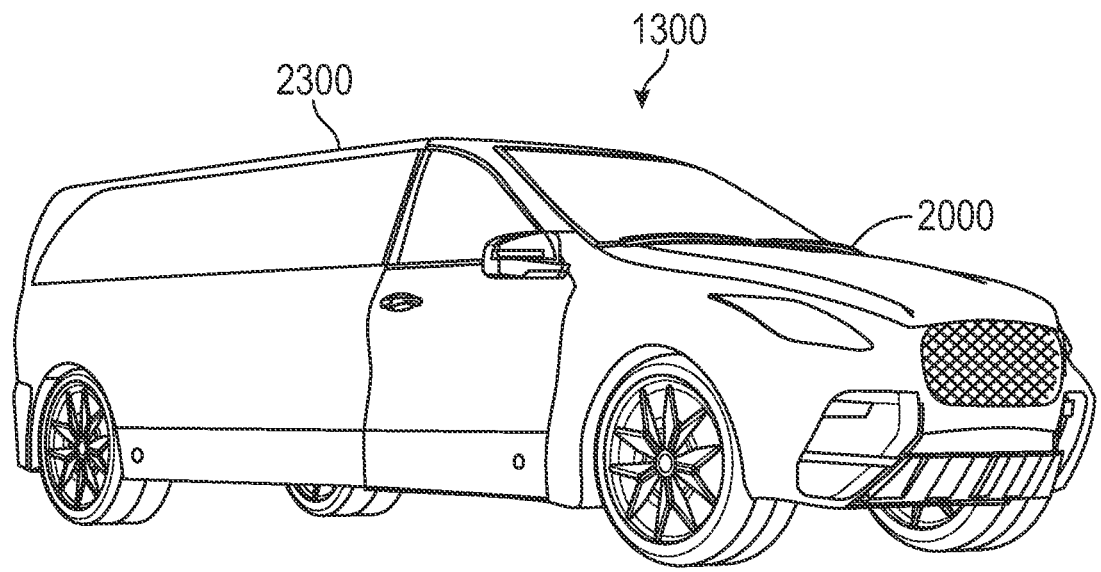
Figure 32:
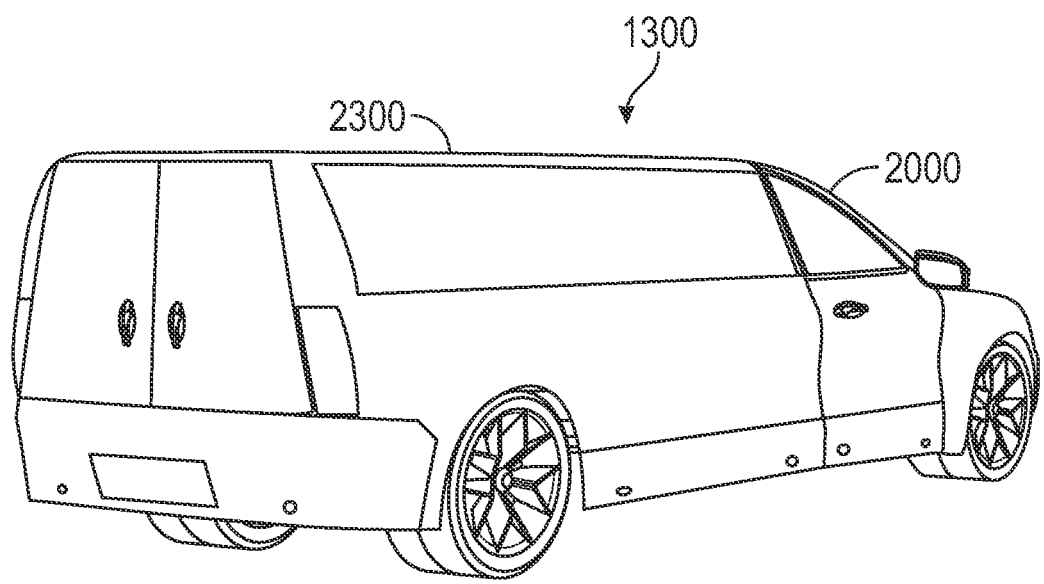
Figure 33:
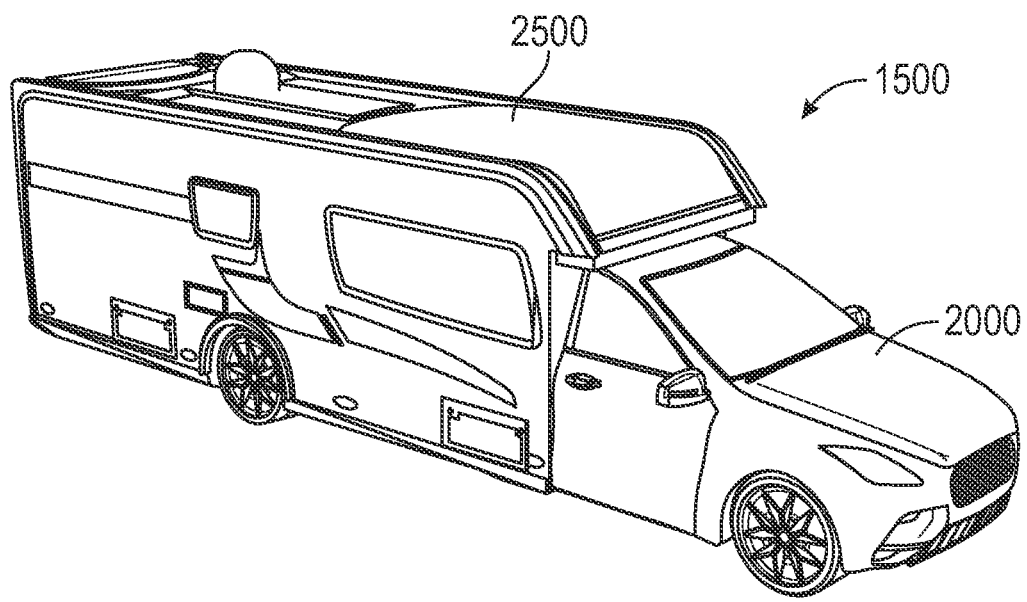
Figure 34:
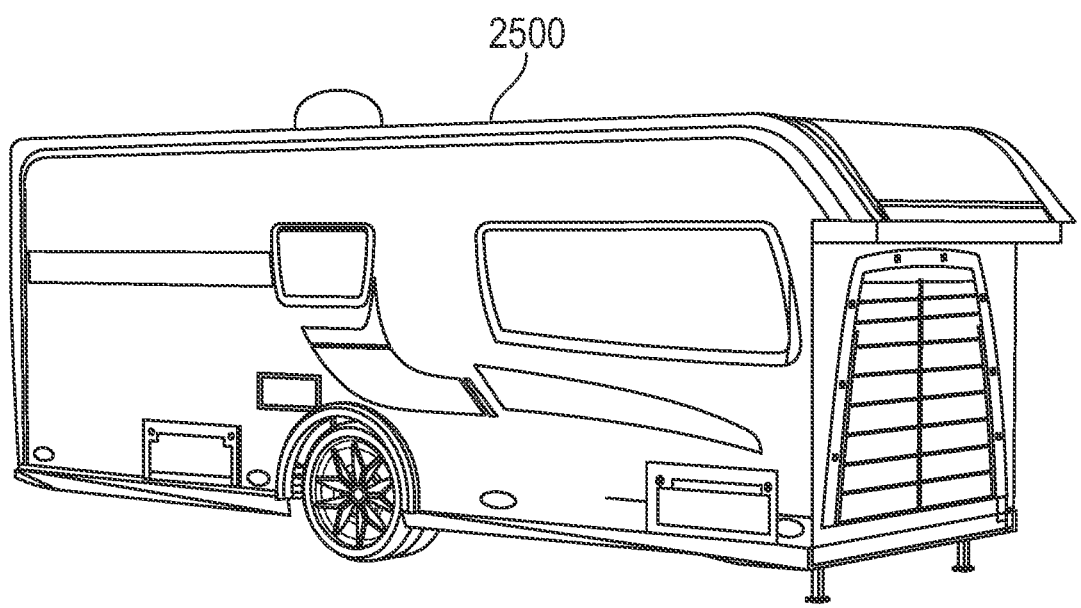
Figure 35:
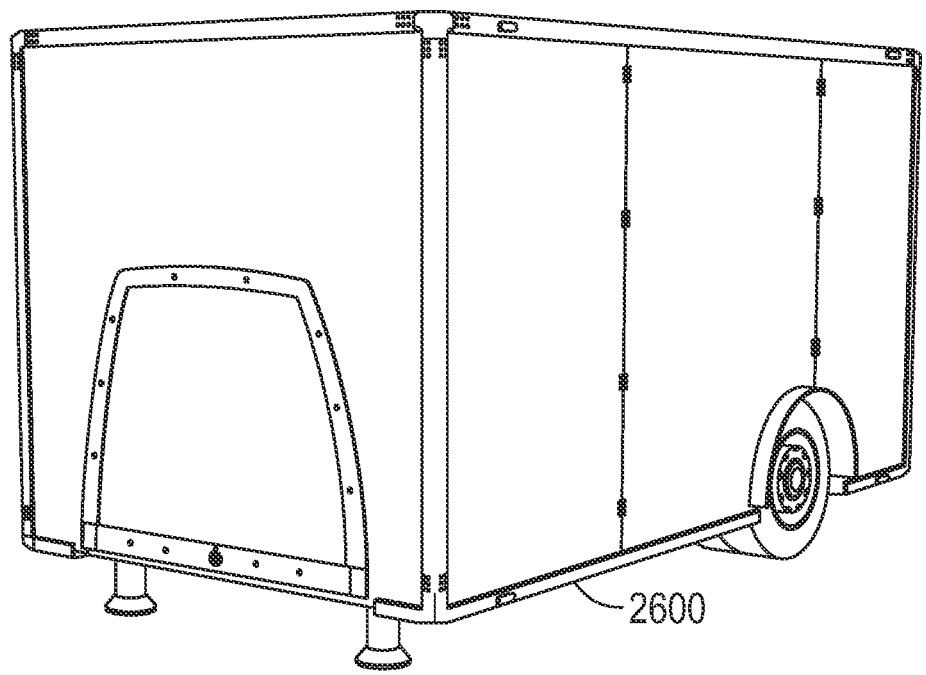
Figure 36:
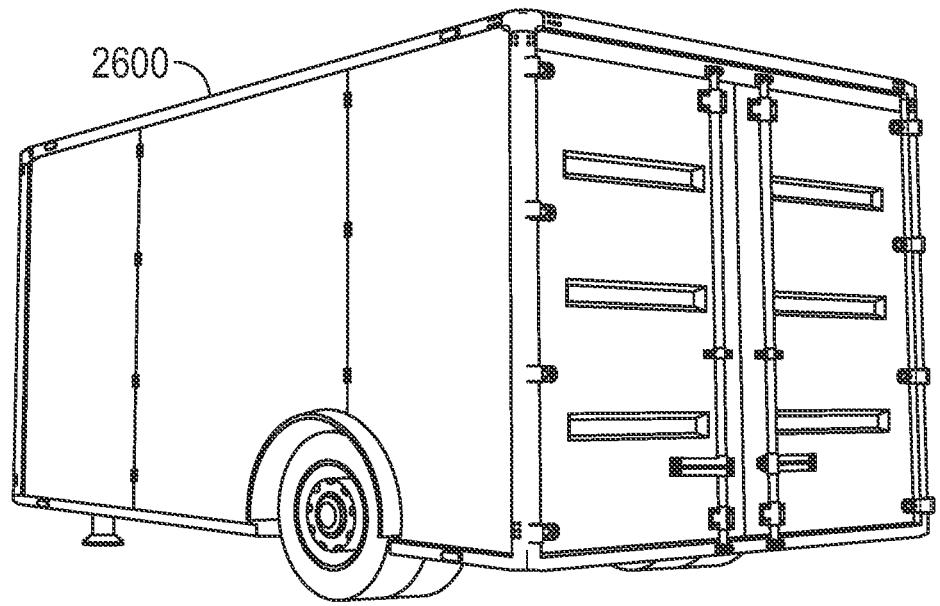
Figure 37:
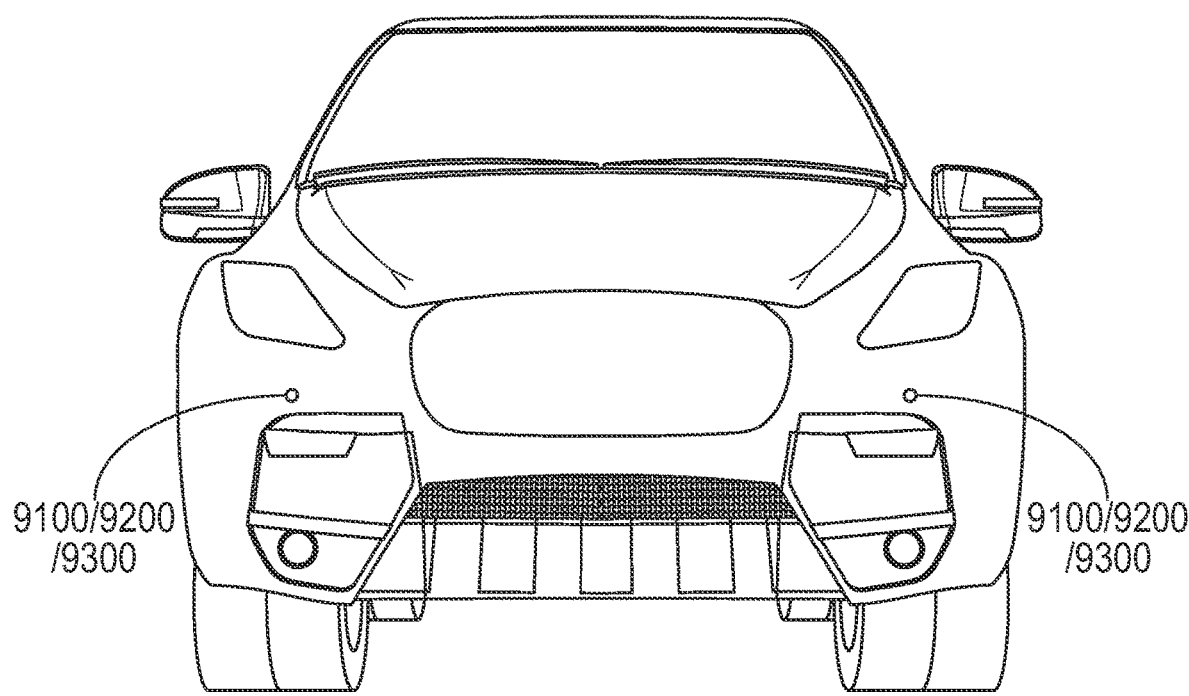
Figure 38:
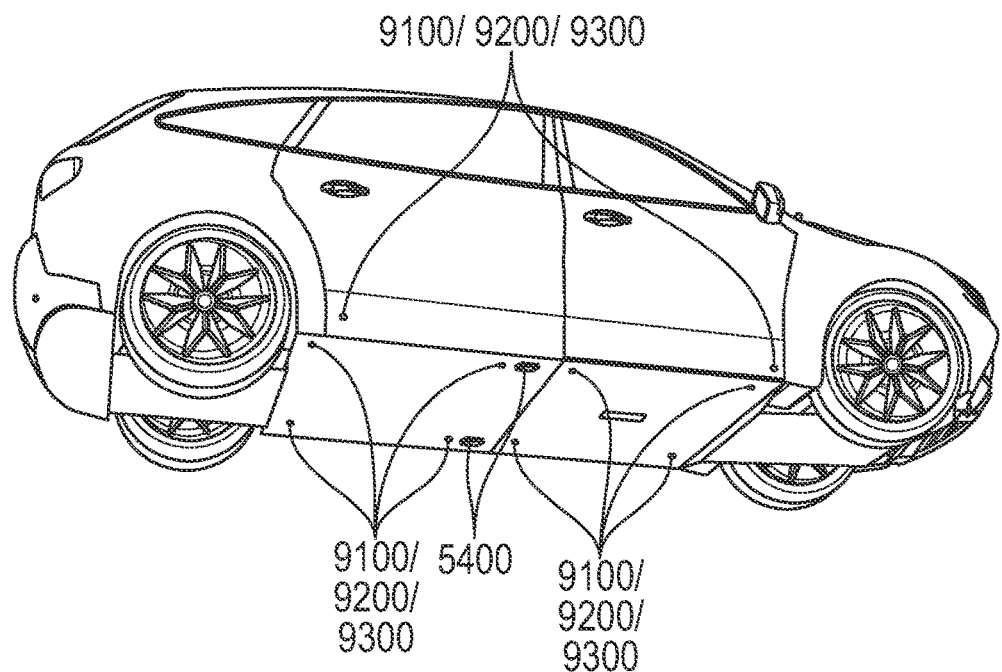
Figure 39:
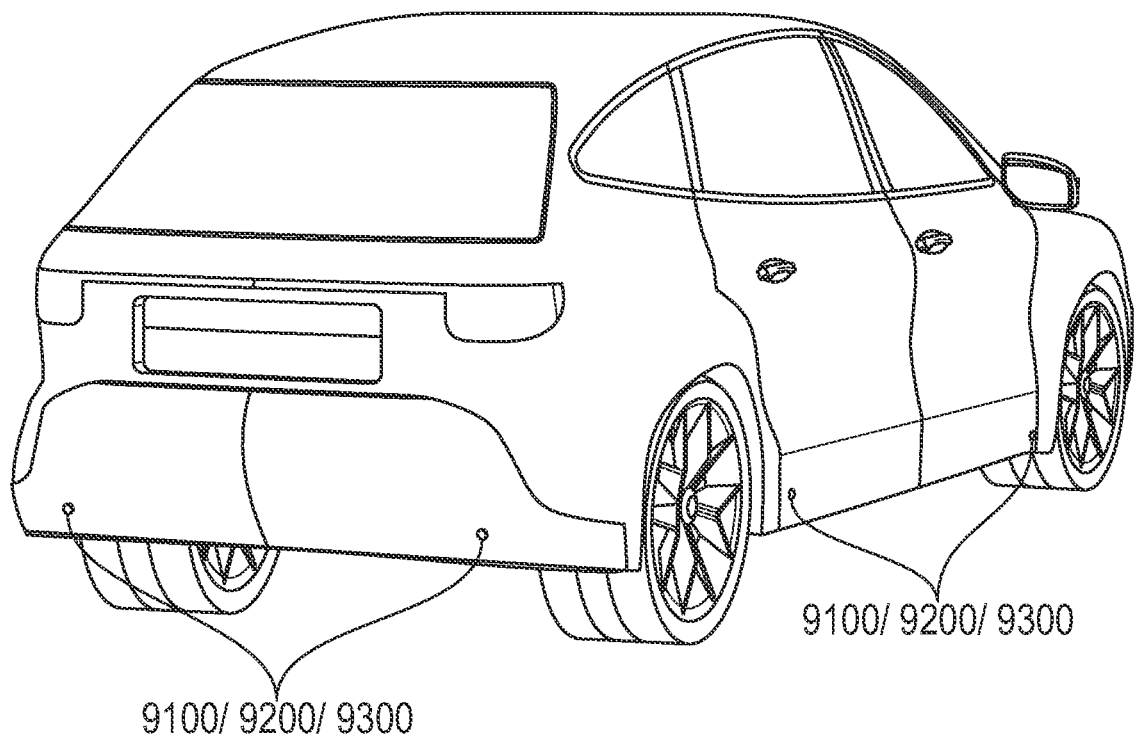
Figure 40:
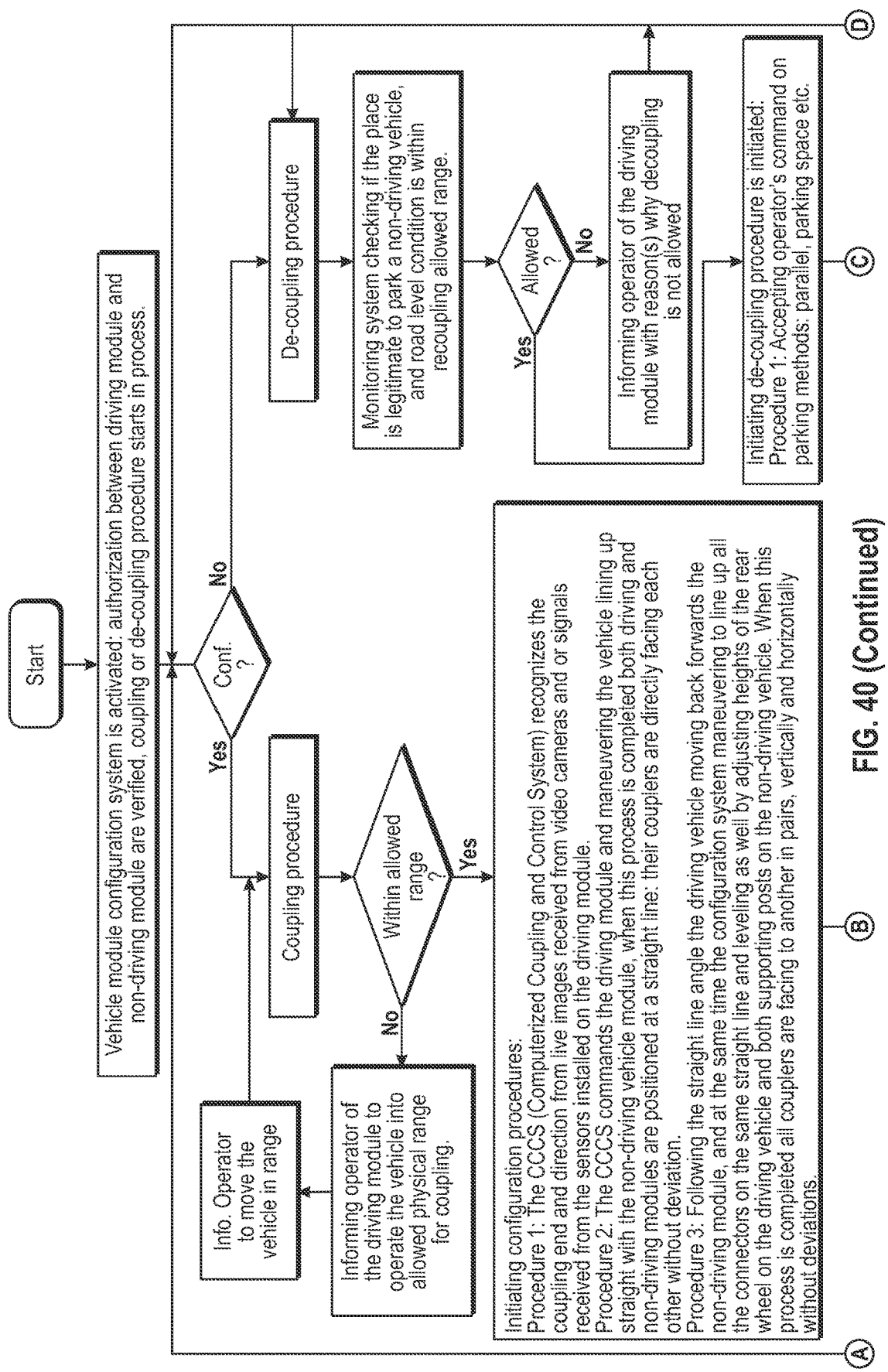
Figure 40:
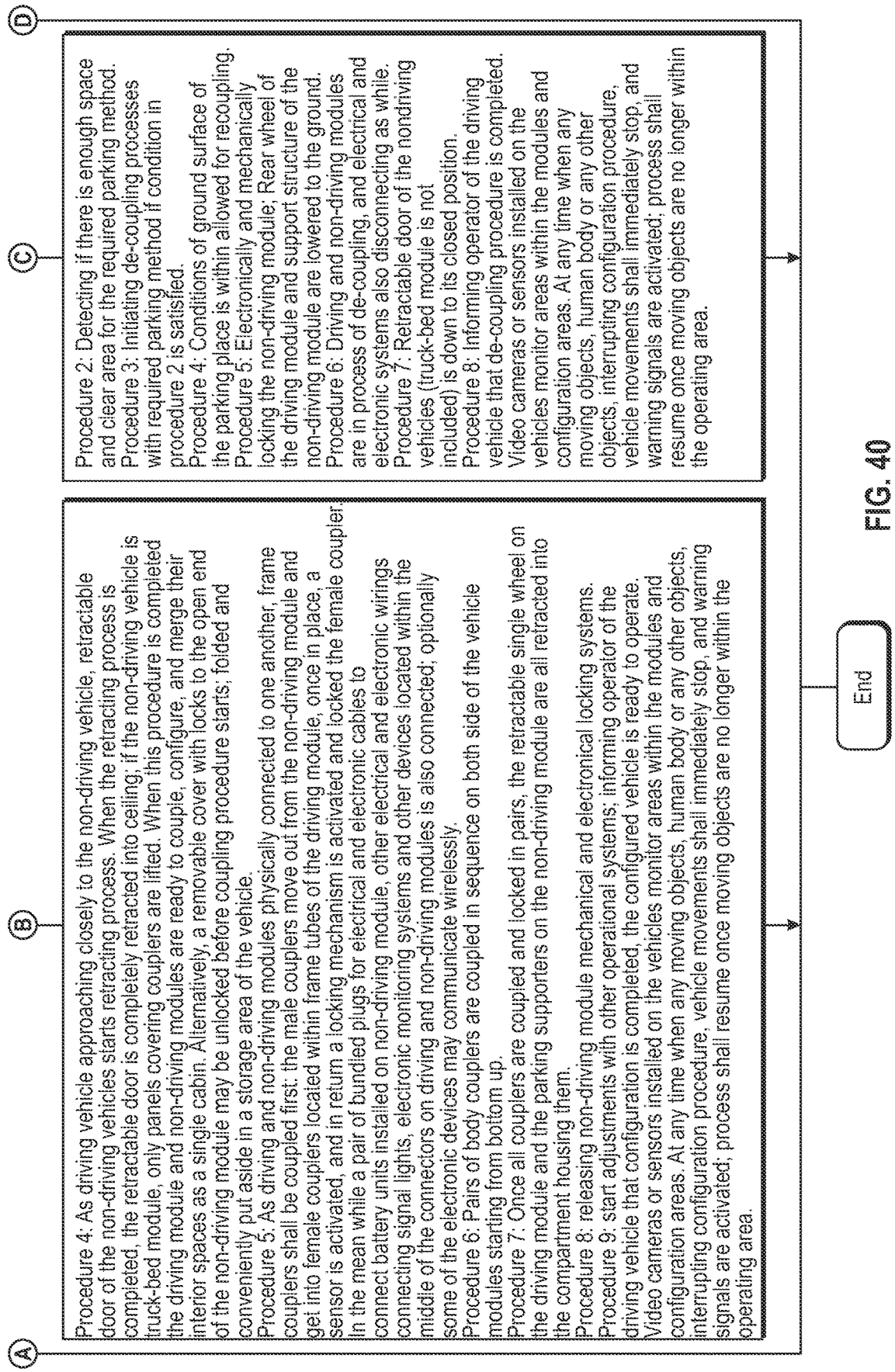
Figure 41:
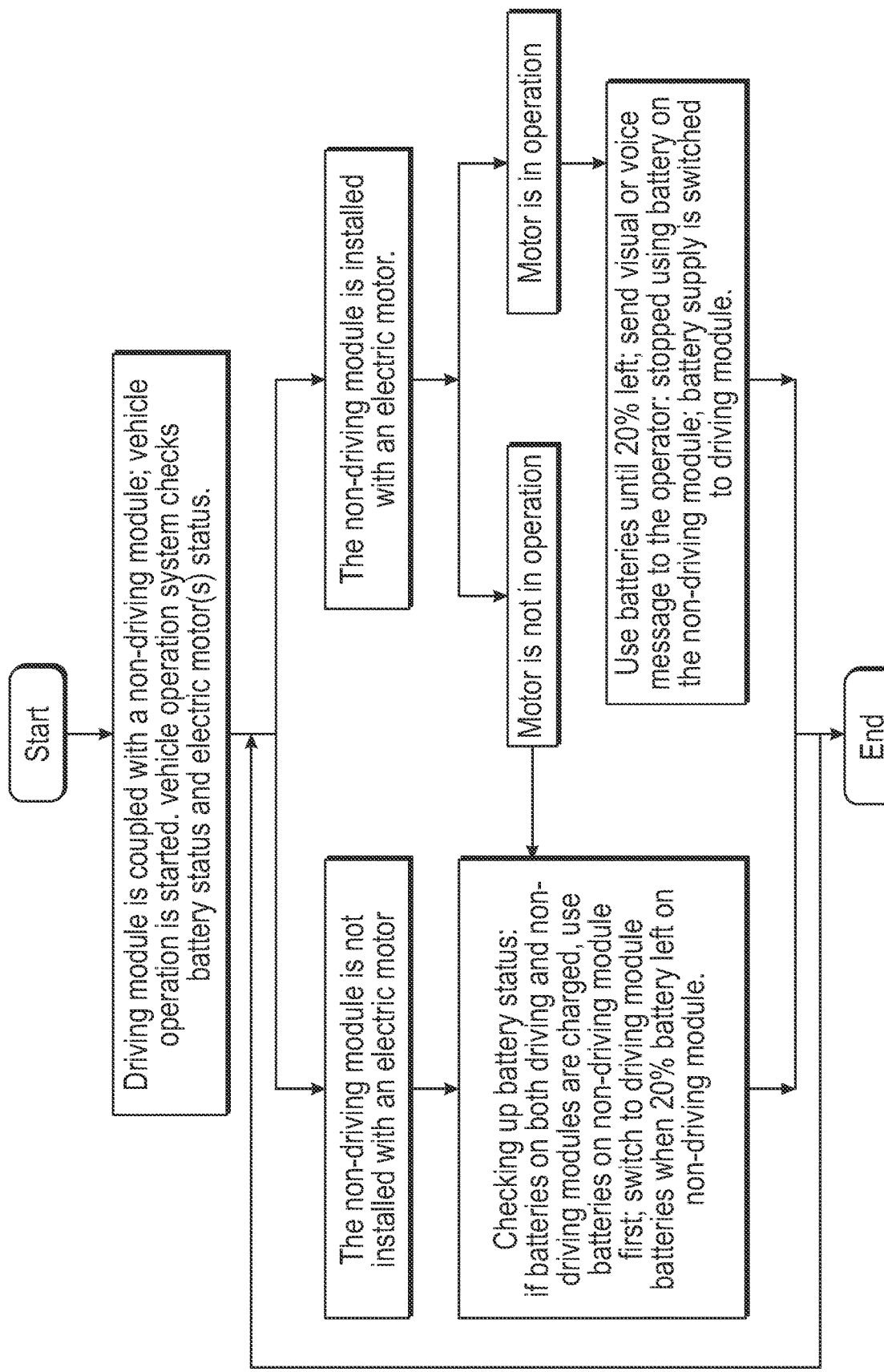
Figure 42:
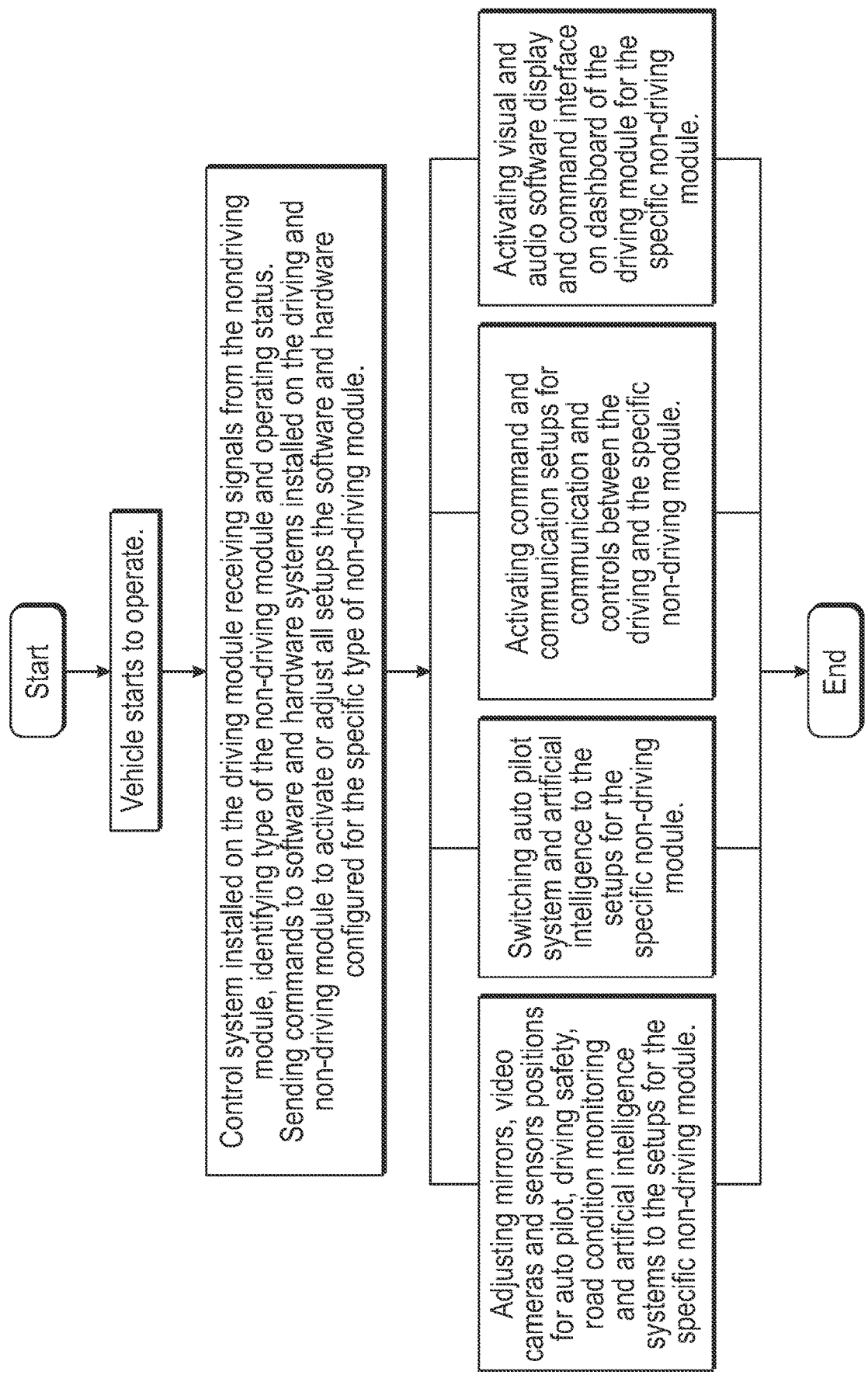

A more complete understanding of the present invention may be had by referencing to the following detailed description and appended claims when taken in conjunction with the accompanying drawings wherein:

FIG. 1 illustrates a driving module and a non-driving module coupled into one vehicle; and FIG. 2 illustrates a coupled driving module and SUV non-driving module with interior structures and other features; and FIG. 3A illustrates chassis, frame and coupling structure of a driving module and a SUV non-driving module; and FIG. 3B illustrates retractable door structure on a non-driving module; and FIG. 4 illustrates a driving module with a single wheel down; and FIG. 5 illustrates position of the single wheel structure on a driving module; and FIG. 6 illustrates another view of the single wheel in operation on a driving module; and FIG. 7 illustrates the single wheel folded and retracted into the compartment housing it on the driving module; and FIG. 8 illustrates couplers of the coupling system on a non-driving module; and FIG. 9 illustrates retractable door on a non-driving module; and FIG. 10 illustrates locking and sliding brackets on a pair of panels on the retractable door; and FIG. 11 illustrates locking brackets on a pair of panels at locking position when the retractable door is at closed position; and FIG. 12 illustrates locking brackets on a pair of panels at releasing position when the retractable door moves up to narrower parts of the body and retracted into the ceiling of the non-driving vehicle; and FIG. 13 illustrates locking and sliding brackets movements on retractable door; and FIG. 14 illustrates a removable and foldable cover with locks is applied to cover the opening section of a non-driving module; and FIG. 15 illustrates positions of couplers on a driving module; and FIG. 16 illustrates positions of couplers on a non-driving module; and FIG. 17 illustrates male frame couplers on non-driving module in engaging position; and FIG. 18 illustrates another view of male frame couplers on a non-driving module in engaging position; and FIG. 19 illustrates locking slots on male frame couplers; and FIG. 20 illustrates coupling process of male couplers and their locking position; and FIG. 21 illustrates locking system and sensors' position female frame couplers; and FIG. 22 illustrates the locking pins of the locking system on a driving module locked in male couplers from a non-driving module after the male couplers reached locking position; and FIG. 23 illustrates the bundled electric and electronic plugs on a driving and a non-driving module; and FIG. 24 illustrates the bundled electric and electronic plugs on a driving module and a non-driving module engaged to each other and locked together; and FIG. 25 illustrates body couplers engaging and locking process; and FIG. 26 illustrates a video camera installed on roof of a non-driving module; and FIG. 27 illustrates truck-bed non-driving module is coupled with a driving module; and FIG. 28 illustrates another truck-bed non-driving module coupled with a driving module; and FIG. 29 illustrates functions configured in the headboard of the truck-bed non-driving module; and FIG. 30 illustrates passenger van non-driving module is coupled with a driving module; and FIG. 31 illustrates tool/working van non-driving module coupled with a driving module; and FIG. 32 illustrates another view of tool/working van non-driving module coupled with a driving module; and FIG. 33 illustrates RV (recreational vehicle) non-driving module is coupled with a driving module; and FIG. 34 illustrates a RV non-driving module; and FIG. 35 illustrates a cargo truck non-driving module; and FIG. 36 illustrates another view of cargo truck non-driving module; and FIG. 37 illustrates sensors and or video cameras installed on the front end of a driving module; and FIG. 38 illustrates sensors or cameras installed on body and chassis of a driving and non-driving modules; and FIG. 39 illustrates sensors or cameras installed on back end of a non-driving module; and FIGS. 40A and 40B A flowchart illustrates a modular vehicle configuration and de-configuration procedures and processes; and FIG. 41 A flow chart illustrates vehicle power supplying scheduling procedures; and FIG. 42 A logic flow chart illustrates road driving condition monitoring and vehicle response system.

DETAILED DESCRIPTION

In the following text, the terms "a multi-modular electric vehicle system", "vehicle", "vehicle module". "modular electric vehicle system", "attached vehicle modules", "driving module", "head", "non-driving module", "tail". "trailer module", "trailer vehicle", "detached vehicle module", "configured vehicle", "non-driving module with four-wheel drive function". "coupler(s)." "coupling system", "sub-coupling system", "a plurality of couplers", "coupling and configuration control system", "coupling and configuration controller", "automated vehicle coupling and configuration system", "coupling and configuration", "decoupling and deconfiguration", "vehicle operation and control system", "vehicle operation controller" etc. may be used interchangeably and may refer to any of a variety of different terms, the coupling system and configuration procedures; vehicle decoupling procedures, control systems, electric controller, vehicle operation controller and other components defining the invention.

The invented multi-modular electric vehicle system consists of a driving vehicle module 2000, and a plurality of non-driving vehicle modules, such as but not limited to the SUV module 2100, truck-bed vehicle module 2200, working/tool vehicle module 2300, passenger vehicle module 2400, recreational vehicle module 2500 and cargo truck module 2600. The non-driving modules may also be installed with an electric motor engine 7200 to facilitate delivery of a vehicle having four-wheel drive or all-wheel drive module. Additionally, the electric motor engine may need to be employed for larger non-driving module to ensure desired driving and torque power thereof ensuing assembly of the two modules.

The driving vehicle module 2000 has installed therein all elements required to operate as an independent vehicle with two front wheels, and a single retractable wheel 4100 located at rear-middle position of the vehicle. In one embodiment the retractable single wheel is installed on chassis area between driver and passenger's seats 4100. It may also be installed on chassis under passengers' bench seats area, or other areas of the driving vehicle module 2000.

The front wheels of the driving vehicle module are operably coupled to an electric engine, steering system, braking system and other driving control and safety systems, not particularly illustrated herein, so as to facilitate independent operation of the driving module 2000. The rear single wheel with a retractable and adjustable system 4300 may be also configured with a braking and a suspension system for use when the driving module is operated independently without being coupled to a non-driving module. It is further contemplated within the scope of the present invention that a balancing and stabilizing system is also configured at rear section of the vehicle if it is also designed to drive without coupling to a non-driving vehicle. The driving module may also be configured with a closed rear-end body comprising a wall member, and wherein the wall member is configured to cover the rear-end of the driving module.

The single retractable wheel is deployed when the vehicle operates independently having no non-driving vehicle module operably coupled thereto. The retractable wheel 4100 is retracted and concealed with a cover 4400 in a housing located within the chassis 4600 when the vehicle is configured with a non-driving vehicle module.

In one embodiment the retractable single wheel of the driving module is designed to provide functions solely for the driving module to be coupled to a non-driving module. The primary function of the retractable wheel 4100 is to provide a simple rear wheel mechanism for coupling the driving module 2000 to a non-driving module. For such configurations, the retractable wheel may be reduced in size so as to save interior and exterior space. It should be further understood within the scope of the present invention that the retractable wheel 4100 could be provided in alternate sizes in order to facilitate independent operation of the driving module 2000. Ensuing operably coupling of the driving module 2000 with a non-driving module the retractable wheel 4100 is retracted in its housing within chassis 4600.

A standard coupling and configuration system enables to provide a plurality of types of vehicle modules leveraging the same coupling configuration process. The coupling and configuration mechanism and process of the present invention is standardized to facilitate operably coupling of the driving module 2000 to a plurality of non-driving modules.

An electric motor 7100 is installed on the driving module 2000. The driving module 2000 further includes an automated vehicle operation control system that is configured to activate and apply different sets of commands and communicate with the operational elements of the present invention including but not limited to the vehicle operation and control system, brake system and other vehicle operational components.

Furthermore, the vehicle operation control system provides the necessary security and safety features to improve the driving experience for occupants of the vehicle. All operational commands are shared between the driving and non-driving vehicle via wired or wireless communications.

An electric motor 7200 may be installed within the non-driving vehicle module 2100 and is operably coupled with wheels of the non-driving module. Providing electric motor 7200 offers an option for the assembled vehicle with rear-wheel drive, four-wheel drive or all-wheel drive. Additionally, the electric motor 7200 may be required in the non-driving module 2100 because of its weight and size thereof.

Four-wheel or all-wheel drive configuration may apply to non-driving modules 2100 such as but not limited to sport utility vehicle, working/tool or utility van, truck, recreational vehicle and cargo truck etc. Such configuration may substantially enhance horsepower of the vehicles when the non-driving modules are large, heavy or simply need more horsepower that the driving module vehicle is not able to provide. In some embodiments a moderate-sized driving module may be configured with large, heavy non-driving module with sufficient horsepower and load capacities.

If both driving and non-driving modules are installed with electric motors, the computerized vehicle control system is configured to synchronize operational parameters between the two electric motors wherein the operational parameters include but are not limited to speed. Upon the occurrence that the non-driving module 2100 has installed thereon different size of tires than the driving module 2000, the computerized vehicle control system coordinates the operational parameters so as to enable different RPMs (rotation per minute) with different sizes of tires and other parameters of the two of electric motors to provide synchronized running speed between the driving and non-driving modules.

If a non-driving module is configured with electric motor, batteries installed within its chassis 9900 and other spaces shall provide electricity to the electric motor installed on it. Batteries installed on the driving module 9900 and non-driving modules are configured to supply electricity to the electric motors installed on the driving module 2000 and non-driving module 2100. If the non-driving module 2100 is also installed with an electric motor, electric supply between the driving module 2000 and non-driving module 2100 are coordinated and it should be further understood within the scope of the present invention that electric power may be redirected and exchangeable between the modules when needed.

When batteries on driving module 2000 and non-driving module 2100 work together supplying electric power to the motor on driving module 2000 only, the system is designed to draw electric power from the batteries on the non-driving module 2100 first until the battery power left reaches a programmed minimum percentage and then automatically switch power supply to the batteries on the driving module 2000. Such approach may be able to provide the vehicle with more driving mileage while preserving power for the non-driving vehicle with its operational needs, such as coupling and decoupling processes, communication, opening or closing retractable door, passengers' door and storage door etc.

The non-driving modules have at least two wheels located at rear section of the modules 9600 and further include a retractable parking support structure 5200 and 5300 located at front section of the non-driving modules for non-driving modules with only two wheels. The retractable parking support structures 5200 extend downward to support the non-driving modules when the non-driving module is parked. The retractable parking support structures 5200 are retracted into compartments 5300 wherein the compartment 5300 further includes therein the actuators configured to move the support structures intermediate their deployed and retracted positions. The retractable parking support structures 5200 are placed in their retracted position in their housing compartment 5300 when the driving module 2000 and non-driving module 2100 are operably coupled for operation.

In the configuration wherein the driving module is designed to be able to operate independently having no non-driving module operably coupled thereto, the rear part of the body of the driving module is installed with a retractable door configured with an actuator. It is to be further understood within the scope of the present invention that a driving module 2000 designed to operate with a non-driving module only may not need to install a retractable door.

A retractable door 6100 is installed and configured with an actuator 6600 and may be automatically retracted or partially retracted into the space between roof and ceiling 6700 of non-driving vehicle modules. Truck bed, cargo truck and another larger non-driving modules may not need a retractable door and as such no retractable door is present. Alternatively, the aforementioned module types could employ a retractable door that could be configured to only lift partially for coupling and configuring with the driving module.

In the configurations wherein the retractable door is entirely concealed between the vehicle roof and ceiling, a large LED screen 6750 covering a section of the ceiling concealing the retractable door is provided and operably coupled to a video camera 6760 installed on the roof of the vehicle. This configuration will allow passengers sitting in that section of the vehicle to see live views of the sky or objects above the vehicle simulating a perspective provided by a conventional sunroof.

The retractable door on non-driving modules is designed to securely seal the vehicle cabin and adjust to the width of the door along with changes of body and cabin shape of the vehicle module during retracting and pulling down process. In one configuration the retractable door is comprised of two parts (6210, 6220) with a plurality of pairs of panels. A pair of brackets (6330,6335) designed to lock each pair of panels together to form one panel structure is installed on each pair of panels. The brackets are installed in the position to be engaged in locking position when the retractable door is pulled down in closed position. When the door is securely closed, the locking brackets securely locked the two panels together. Two pairs of brackets 6355 with sliding channel 6357 installed on each pair of panels securely fastened the panels together at any moving position. When the door is being retracted the pairs of locking brackets are released from locking position as the panels are lifted through upper-side narrower part of the vehicle body and each pair of panels moves towards each other and the part of the door becomes narrower.

Alternatively, a removable cover 6800 with locks 6850 is used to securely cover the open end of a non-driving module when not in use. The removable cover may be unlocked and then conveniently folded and put in a storage area of the vehicle or other location. Ensuing removal of the removable cover 6800 the non-driving module is ready to be coupled with the driving module. A removable cover is utilized in embodiments when there is no space on the ceiling and other areas inside the non-driving module occupied with the retractable door and its mechanism. Additionally, a removable cover may substantially reduce cost incurred to on manufacturing the non-driving module. Since the same coupling system is utilized on all vehicle modules, the cover may be used on all non-driving modules with open frontend. It is further contemplated within the scope of the present invention that the retractable door may be made of high strength and light materials and pull up and down manually to save space and costs. Furthermore, if the driving vehicle is designed to be coupled and operate with a non-driving vehicle only, the driving module is restricted to run independently, and therefore there is no need to install a retractable cover on it.

The automated vehicle module coupling and configuration system consists of: a control system; longitudinal frame couplers for connecting and combining frames of the driving module 3100 and a non-driving module 3110 into one frame; a pair of bundled plugs 3310 and 3320 for connecting and configuring electronic and computer systems, electric system, signaling system, safety and operational systems and other software and hardware connections between driving and non-driving modules; a plurality of vehicle body couplers 3210 and 3230 for connecting and coupling bodies of the driving and the non-driving module into one vehicle body; a sensor and or video imaging system; an independent adjustable suspension system; a retractable and adjustable single wheel on the driving module; and a retractable and adjustable parking support system on the non-driving modules.

The longitudinal frame couplers are paired with one installed on the driving module and the other installed on non-driving module. The operator of the driving vehicle module provides a command to the automated vehicle coupling and configuration system installed on the driving module to initiate the process of coupling and configuring a driving and a non-driving module. During the operable coupling of the two modules, the non-driving module operably accepts the configuration commands from the driving vehicle and coordinates configuration procedures to facilitate completion of the operable coupling of the two modules. Body couplers can be located entirely between outer metal body and interior vinyl structure of the vehicles without occupying interior space. The coupling and configuration commands may be initiated via a graphic user interface on a dashboard in the driving module. Alternatively, a command from an authorized or recognized voice or an authorization sent via mobile app or other wireless communications can be utilized to initiate coupling. Furthermore, an authorization device either wirelessly communicating within distance of the vehicle modules ready to configure and coupling or a device plugged in on dashboard of the driving module can be deployed to activate the coupling process.

In one embodiment adjustable suspensions 8100, such as hydraulic suspension, air or hydro-gas suspensions are installed on wheels on the driving module and non-driving modules. The adjustable suspensions 8100 are individually configured and controlled by the automated vehicle coupling and configuration system. A hydraulic actuator 4500 configured with a retractable single wheel is also configured with the automated vehicle coupling and configuration system. The retractable parking support structures 5200 of the non-driving vehicle modules configured with actuators are also individually controlled by the automated vehicle coupling and configuration system. Wheels and parking supporters 5200 are able to raise or lower their positions independently. Sensors 9100, 9200 and 9300 are installed on the vehicle module bodies and or under chassis wherein the sensors 9100, 9200, and 9300 send signals about ground conditions to the automated vehicle coupling and configuration controller during the coupling of the driving module 2000 and non-driving module 2100. It should be understood within the scope of the present invention that the sensors 9100, 9200 and 9300 could employ sensing technology such as but not limited to acoustic, laser imaging technology such as Lidar (Light Detection and Ranging), infrared and optical, ultrasonic sensors or video.

During the coupling process the automated vehicle coupling and configuration system receives signals from the sensors or images about ground conditions and subsequently sends commands to the actuators and the suspension elements so as to maneuver and adjust the height of the retractable wheel and parking supporters 5200. The automated vehicle coupling and configuration system is programmed to operably level and line up the driving module 2000 and the non-driving vehicle module 2100 in a straight line and on the same level by receiving, measuring and calculating live images from video cameras and/or signals from sensors 9100, 9200 and 9300 so as to facilitate the coupling process.

The automated vehicle coupling and configuration system recognizes the coupling end and direction from live images received from video cameras and or the sensors 9100 installed on the driving module 2000 and non-driving module 2100. The automated vehicle coupling and configuration system is programmed to maneuver the driving module to align with the non-driving module. The driving module 2000 is maneuvered to a position so that it may be able to maneuver rearwards toward a non-driving module. The automated vehicle coupling and configuration system positions the rear end of the driving module 2000 and front end of the non-driving module 2100 facing each other first. Ensuing initial placement the driving module will completely align itself with the non-driving module. Concurrently, the automated vehicle coupling and configuration controller receives live images or signals from video cameras and/or sensors 9100 installed on chassis of the driving and non-driving modules the vehicle modules so as to facilitate the operable leveling of the modules by operably adjusting the height of the wheels of the driving module as well as the parking support structures 5200 and wheels of the non-driving vehicle module. Ensuring the leveling and alignment provides that the pairs of the couplers are able to accurately connect to each other accordingly. The alignment and leveling process continues as the driving module 2000 approaches the non-driving module 2100 until couplers on both modules are precisely aligned and levelled with one another in order to be prepared for physical connections.

At the time when the driving and non-driving modules are maneuvered to axially align and the pairs of couplers 3100 and 3110 are precisely aligned facing one another and physically engaged, the modules are confirmed to be leveled and aligned prior to initiating the coupling process. The leveling and alignment process is also required before decoupling process is allowed, this is to ensure that ground surface conditions are within allowed maneuvering and leveling range for the modules to not only properly de-couple but to be able to re-couple.

If the non-driving vehicle module is the truck-bed module 2200 or cargo truck 2600, the front-end of the truck bed module 2200 shall only open the coupler concealing panels for vehicle configuration and coupling mechanisms, which are exposed to each other and ready for physical configuration and coupling. The headboard 3400 of the truck bed module is utilized to cover and seal rear body of the driving module. Adjacent a glass window 3420 inside the headboard are compartments for housing elements such as but not limited to coupling and supporting structures, module control and communication systems.

Still in one embodiment once the driving module and the non-driving module are physically connected to each other, two pairs of longitudinal frame members 3100 are engaged in the coupling process. These chassis frame members 3100 bear all the weight of the vehicle and are the most important joining mechanism of the modular vehicles. The chassis frame members 3100 are made of rectangular or square steel tubes and are structured and configured as a part of the longitudinal frame member of the vehicle modules. The male frame couplers 3110 with rack gear 3135 are located in the inner hollow space of the longitudinal frame member of the non-driving modules, and the female frame couplers 3120 are the inner hollow space of longitudinal frame member of the driving module. A locking system 3141 is installed on the longitudinal frame member of the driving module. The male coupler, with its rack gear 3135 engaged with and driven by a pinion gear within an actuator 3130 located on the longitudinal frame member of the non-driving module, operably moves into the female coupler 3151, 3152 and 3153, the inner space of longitudinal frame member of the driving module. When the male coupler touches a sensor or a switch 3144 located within and at the end of the frame tube of the driving module, the sensor or the switch is activated and sends signal to the coupling and configuration control system which in turn commands the frame coupler locking system 3141 to activate and lock the frame coupler with its locking pins 3142. Once the locking pins are engaged in the locking slots located on the male frame coupler 3145 and on the female frame coupler 3143, locking process is completed, the control system signals the next coupling step may commence.

At the time when longitudinal frame coupling is completed, the pair of bundled plugs 3310 and 3320 located at cross frame members on both driving and non-driving modules to connect electric and electronic devices between the driving and non-driving modules are also positioned to be operably coupled. Once this step of pairing process is completed, this single bundled pair of plugs shall have all communication, electric and electronic connections and operational mechanism between the driving and non-driving modules operably coupled.

A plurality of pairs of body couplers 3210, 3230 are located on rear lower end, left and rear right side and on top of the driving module, and on lower end and left and right side of the front end and on top of the non-driving modules. Each of these pairs of body couplers are comprised of a female coupler 3230 having nuts with threads located on the driving module configured with an actuator 3200. The body couplers 3210 further include a male coupler with bolt 3210 having threads configured with an actuator 3220 located on the non-driving module.

A sensor or touch switch 3240 is located at the end inside of each of the female coupler. The male couplers located on the non-driving module engage into the female couplers located on the driving vehicle. Lower-positioned pairs of couplers start the configuration process first and when a sensor detects the pair of couplers are fully engaged the female actuator will lock the pair of male couplers with its locking slot 3215. Subsequently a signal is sent to the automated vehicle coupling and configuration system, which in turn commands the pairs of couplers above them start configuration process. This process repeats until the couplers on both sides of the vehicle modules are operably coupled. Subsequently, the process to configure couplers on the top of the vehicle modules commences and completes.

Longitudinal couplers connecting chassis frames between driving and non-driving module may be designed with different ways for the connections. For instance, if the male frame couplers are configured on a driving module then the female chassis couplers are configured on non-driving module, such arrangements are more reasonable only when the driving module is larger, and vice versa if the driving module is smaller. By way of example but not limitation a driving module only having two seats for the driver and a passenger, then the male frame coupler shall be located within chassis frame of the non-driving module, and female frame coupler in return located on the driving module as illustrated above. Such arrangement allows larger non-driving module to be coupled with a smaller size driving module, as such what depicted in the drawings and described above.

After the completion of the coupling and configuration procedure, the automated vehicle coupling and configuration system sends a signal to operation control system of the driving vehicle to start other configuration procedures required for a specific module's coupling and configuration process. The aforementioned entails but is not limited to, adjusting driving monitoring systems, safety systems, self-driving and self-parking systems in accordance with particular types of non-driving vehicle configured with the driving vehicle module since different non-driving modules process different body size, width, length and height as well as other variances.

Safety and warning system, self-driving systems and driving observation system and devices, electric power supplies and motor torque and other mechanical and electronic systems shall automatically adjust to operate with specific vehicle configuration status and requirements according to specific modules configured.

During the configuration process a safety monitoring system monitors if any foreign objects or human movements are within the configuration safety space, configuration process shall immediately be suspended. The configuration process shall resume once interruptive movements are no longer within range for the coupling and configuration process. The automated vehicle coupling and configuration system shall operate independently without interference from the operator of the vehicle modules.

Procedures of decoupling and deconfiguration of the vehicles may reverse the steps for coupling and configuration, for instance, in one embodiment couplers at top of the vehicles shall be de-coupled first and once completed send a signal to the controller, which sends commands to the next inline pair(s) of connectors to start de-coupling process until all connectors are disengaged. Thenceforth, the vehicle configuration system sends a signal to the central control system of the driving vehicle to resume the mode for the driving vehicle to operate by itself. In different embodiments method and or sequences of configuring and de-configuring vehicles may vary.

A monitor system monitors the coupling and configuration process, and if it detects signals that the coupling and configuration process is malfunctioning, the monitor sends out warning signals and disables vehicle operational system until problems are fixed. The entire coupling and configuration process, decoupling and deconfiguration process may be operated and completed by a vehicle operator with a wireless device.

When the driving vehicle module operates independently, electric supplies for the vehicle is solely from the batteries 9900 installed in the vehicle. When the driving vehicle module is configured with a non-driving vehicle module, electric power supply for the vehicle is from the batteries 9900 installed in both the driving and the non-driving vehicle. If the non-driving module also installed with an electric motor for a four-wheel driving configuration, batteries installed on the non-driving module shall provide electricity to the electric engine installed on it. Modules may be charged with electricity individually, or once configured may be charged with a single charging connection. To best utilize spaces and increase vehicle capacities and driving mileage and reduce battery charge frequency, a solid-state battery system may be configured to all vehicle modules.

Driving safety is the ultimate priority, the driving vehicle module is equipped with an auto pilot navigation driving system, an optical recognition, surrounding reality (SR), an artificial intelligence learning system, a vehicle operation security and protection system, airbag, onboard communication system and warning system with adjacent vehicles for safety communication, and other advanced operation, safety and communication systems.

Since the driving module may be coupled with a plurality of non-driving modules varying in sizes, weights and functions, unpredictable road conditions may cause bumpy and unpredictable driving experiences. Sensors and or video cameras 9100, 9200, 9300 are installed on front-end or other places of the vehicle to monitor and send back signals to the vehicle operation and control system, the vehicle operation and control system sends specific commands according to the specific non-driving module coupled to the driving module at the time of driving to individual suspensions and promptly adjust their positions for the road conditions to secure safe and smooth driving experiences.

For safety of the operator and surrounding area, coupling and configuration procedures may be done with no operator being sitting in said driving module. Said coupling and configuration controller may be configured to receive commands from a user device wherein the user device is communicably coupled to the coupling and configuration controller via a wireless communication protocol.

Each of said driving module and said non-driving module is assigned with a digital identification.

An authorization code may be assigned to allow a driving module and a non-driving module to be coupled and configurated.

A security software system designed to protect operation of the vehicle is configured to secure operation of the vehicle, including preventing decoupling process being activated during operation of the vehicle from malfunction of the vehicle control systems, or from malicious software hacking etc.

Augmented reality algorithm assisting operation of the vehicle are configured with the control systems of the vehicles, and as a part of smart system for driving, parking and safety measurements. AI (artificial intelligence) algorithms are constantly in learning process through interactive experience with a real-world environment and vehicle operations: including analyzing individual driver's driving habits, road conditions etc. The algorithms are also constantly enhanced by computer-generated perceptual information across plurality of modular vehicle platforms, including visual, auditory, operational and data received from vehicle performances, and olfactory (for instance detecting consumption of alcohol or use of controlled substances by driver and or passengers). These functions are particularly important for the module vehicle system since vehicle functions, sizes, weight and safety measurements are varying depending on specific configuration and couplings of vehicle modules.

Data collected by an onboard AI system, such as a driver's driving habits, frequent routings, road condition, past experiences of driving with different non-driving modules may be transferred securely and wirelessly to another driving module when the driver buys, rents, switches his driving module with another owner of driving module.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define the described systems. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Although the embodiments of the present technology have been illustrated in the accompanying drawings and described in the foregoing detailed description, it is to be understood that the present technology is not to be limited to just the embodiments disclosed, but that the technology described herein is capable of numerous rearrangements, modifications and substitutions without departing from the scope of claims hereafter. Drawings accompanied with the illustrations are for the sole purposes of demonstrating the inventive concepts only and are not drawn in scales and ratio. The claims as follows are intended to include all modifications and alterations insofar as they come within the scope of the claims or the equivalent thereof.

What is claimed is:

1. A multi-modular vehicle system comprising:
   a driving module, comprising:
      a vehicle structure and a body member;
      an open rear-end body or a closed rear-end body comprising a wall member;
      a vehicle control system;

a safety monitoring control system configured for controlling vehicle operational features and functions:
an automated coupling and configuration system (ACCS);
two front wheels with adjustable suspensions communicably coupled with said automated coupling and configuration system (ACCS) disposed at a front portion of a vehicle platform of said driving module, wherein said two front wheels comprise a first wheel and a second wheel, wherein said first wheel is disposed on right side of said front portion of said vehicle platform of said driving module, and wherein said second wheel is disposed on left side of said front portion of said vehicle platform of said driving module;
said two front wheels operably configured with a propulsion assembly, wherein said propulsion assembly comprises a motor and a battery power source that supplies electric power to said motor, and wherein said propulsion assembly is disposed in said driving module and configured to provide propulsion thereof;
an adjustable and retractable third wheel communicably coupled with said automated coupling and configuration system (ACCS), wherein said adjustable and retractable third wheel is disposed at a center of a rear portion of said vehicle platform of said driving module, wherein said adjustable and retractable third wheel is configured to operably retract into a housing compartment, wherein said adjustable and retractable third wheel facilitates automated coupling and automated decoupling of said driving module and a plurality of interchangeable non-driving modules, and wherein said adjustable and retractable third wheel also facilitates independent operation of said driving module as a three-wheel vehicle when said driving module is not coupled to any of said plurality of interchangeable non-driving modules;
said plurality of interchangeable non-driving modules, wherein said plurality of interchangeable non-driving modules vary in size, function and capacity, wherein each of said plurality of interchangeable non-driving modules are configured to be coupled to said driving module, wherein said plurality of interchangeable non-driving modules comprise one of (a) an open front-end body disposed with a retractable or a removable door, and (b) a closed front-end body, wherein said driving module when coupled with any of said plurality of interchangeable non-driving modules transforms into a four wheel vehicle, wherein each of said plurality of interchangeable non-driving modules is communicably coupled with said automated coupling and configuration system (ACCS) in said driving module, and wherein each of said plurality of interchangeable non-driving modules comprise:
a vehicle structure and a body member;
at least one pair of wheels with adjustable suspensions communicably coupled with said automated coupling and configuration system (ACCS) in said driving module, wherein said at least one pair of wheels are disposed at a rear portion of a vehicle platform of said non-driving module, wherein one wheel of said at least one pair of wheels is disposed on left side of said rear portion of said vehicle platform of said non-driving module, and wherein another one of said at least one pair of wheels is disposed on right side of said rear portion of said vehicle platform of said non-driving module;
at least two adjustable and retractable parking support members communicably coupled with said automated coupling and configuration system (ACCS) in said driving module, wherein said at least two adjustable and retractable parking support members are operably coupled to a frame of said non-driving module at a front end thereof, wherein said parking support members are configured to traverse in an upwards and downwards direction, wherein said parking support members are configured to operably maintain a level orientation of said non-driving module upon being coupled with or de-coupled from said driving module, and wherein said at least two adjustable and retractable parking support members retract into a housing compartment when coupling and configuration process of said driving module and said non-driving module is completed;
a pair of longitudinal female couplers disposed in a longitudinal frame member of said vehicle platform of said driving module, wherein each of said longitudinal female couplers is configured with a locking mechanism communicably coupled with said automated coupling and configuration system (ACCS) in said driving module, wherein sensors are disposed at an inner end of each of said longitudinal female couplers, and wherein said sensors are communicably coupled with said automated coupling and configuration system (ACCS) in said driving module;
a pair of longitudinal male couplers with a rack gear disposed in a longitudinal frame member of said non-driving module, wherein each of said longitudinal male couplers is configured to move between a first position and a second position, wherein said rack gear is configured with a pinion gear of an actuator communicably coupled with said automated coupling and configuration system (ACCS) in said driving module; and
a plurality of sensors and/or cameras communicably coupled with said automated coupling and configuration system (ACCS) in said driving module, wherein said plurality of sensors are disposed at a plurality of positions on said driving module and said non-driving module.

2. The multi-modular vehicle system as recited in claim 1, further comprising a monitoring system, wherein said monitoring system is disposed in said driving module and said non-driving module, and wherein said monitoring system facilitates operable coupling of said driving module and said non-driving module.

3. The multi-modular vehicle system as recited in claim 1, wherein said non-driving module further comprises a pair of parking support members, wherein said pair of parking support members are operably coupled to the frame of said non-driving module at the front end thereof, wherein said pair of parking support members are communicably coupled with said automated coupling and configuration system (ACCS) in said driving module and are configured to traverse in the upwards-downwards direction, wherein said pair of parking support members are operable to adjust and maintain the level orientation of said non-driving module, and wherein said pair of parking support members retract into housing compartments after said coupling and configuration process is completed.

4. The multi-modular vehicle system as recited in claim 1, wherein said driving module and said non-driving module further comprise a plurality of body member fasteners operably and communicably coupled with said automated coupling and configuration system (ACCS) in said driving module, wherein said plurality of body member fasteners comprise a plurality of female body member fasteners located on said body member of said driving module, wherein said plurality of body member fasteners comprise a plurality of male body member fasteners located on said body member of said non-driving module, wherein said plurality of body member fasteners are configured to releasably secure said body member of said non-driving module to said body member of said driving module, wherein a locking mechanism is activated to securely lock said male body member fasteners when said male body member fasteners touch sensors communicably coupled with said automated coupling and configuration system (ACCS) in said driving module, and wherein said sensors are disposed at an inner end of said female body member fasteners.

5. The multi-modular vehicle system as recited in claim 1, wherein said body member of said non-driving module further comprises an opening proximate said front end of said body member of said non-driving module, wherein said opening further comprises the retractable door or a removable door providing access to said opening of said body member of said non-driving module.

6. The multi-modular vehicle system as recited in claim 1, wherein said body member of said non-driving module further comprises a closed front-end comprising a wall member, and wherein said wall member is configured to cover said front-end of said non-driving module.

7. The multi-modular vehicle system as recited in claim 1, wherein each of said driving module and said non-driving module further comprise an independent suspension system, wherein said independent suspension system is communicably and operably coupled with said automated coupling and configuration system (ACCS) in said driving module, wherein said independent suspension systems of said driving module and said non-driving module are configured to provide leveling of said driving module and said non-driving module to facilitate said automated coupling and configuration process.

8. The multi-modular vehicle system as recited in claim 1, wherein said automated coupling and configuration system (ACCS) in said driving module operably provides commands for adjusting positions of said third wheel in said driving module, independent suspension systems in said driving module and said non-driving module, and parking support members in said non-driving module, based on data collected by said sensors and/or cameras.

9. The multi-modular vehicle system as recited in claim 2, wherein said monitoring system comprises a sensor and/or a camera operably connected to said automated coupling and configuration system (ACCS) in said driving module to provide monitoring and control of all coupling elements disposed in said driving module and said non-driving module so as to facilitate said automated coupling of said driving module and said non-driving module.

10. The multi-modular vehicle system as recited in claim 1, wherein said automated coupling and configuration system (ACCS) is operable in a first mode and a second mode, wherein in said first mode said automated coupling and configuration system (ACCS) is operable to provide alignment and leveling function by adjusting a position of said driving module and non-driving module, wherein said automated coupling and configuration system (ACCS) provides adjustment of said third wheel on said driving module, adjustment of said independent suspensions on said driving and non-driving module, and said parking support members on said non-driving module based on data collected by sensors and/or cameras, wherein in said second mode said automated coupling and configuration system (ACCS) is operable to provide coupling of said driving module and said non-driving module.

11. The multi-modular vehicle system as recited in claim 2, wherein said monitoring system is communicably coupled to a vehicle operation controller and operably provides monitoring of road conditions, and wherein said vehicle operation controller is configured to command adjustments of said suspensions in said driving module and said non-driving module based on data collected by sensors or cameras.

12. The multi-modular vehicle system as recited in claim 1, wherein said automated coupling and configuration system (ACCS) is operably configured to receive commands from a user interface of said automated coupling and configuration system (ACCS), or from a user device, wherein said user device is communicably coupled to said automated coupling and configuration system (ACCS) via a wireless communication protocol.

13. The multi-modular vehicle system as recited in claim 1, wherein said driving module and said non-driving module further comprise a digital identification.

14. The multi-modular vehicle system as recited in claim 1, wherein an authorization code is assigned to said driving module and said non-driving module for authorizing said coupling and configuration of said driving module and said non-driving module.

15. The multi-modular vehicle system as recited in claim 1, wherein an electronic display panel is disposed in the interior of said vehicle structure, wherein said electronic display panel is operably coupled to a video camera, wherein said video camera is securely disposed external to said vehicle structure, and wherein said video camera provides real time video data to said electronic display panel.

16. The multi-modular vehicle system as recited in claim 1, wherein said vehicle control system of said driving module is configured to activate or adjust vehicle monitoring, safety, operational and control functions, and features, according to a specific type, model of non-driving module coupled and configured to said driving module.

17. The multi-modular vehicle system as recited in claim 1, wherein said automated coupling and configuration system (ACCS) is configured with an artificial intelligence software and learns to adopt more secure, efficient measures and maneuvers in various coupling and configuration environments and ground and surrounding conditions to improve said coupling and configuration process.

18. The multi-modular vehicle system as recited in claim 1, wherein said vehicle control system is configured with an artificial intelligence software that learns and adopts more secure, efficient measures and maneuvers in various driving conditions and environments to improve safety and driving experience.

19. The multi-modular vehicle system as recited in claim 1, wherein said vehicle control system is configured with an artificial intelligence software that learns to adopt to customized driving experiences with each individual vehicle operator based on data accumulated when said individual vehicle operator drives said driving module coupled with one or more of said plurality of non-driving modules.

20. The multi-modular vehicle system as recited in claim 1, wherein said at least one pair of wheels of said non-driving module is configured with a propulsion assembly, wherein said propulsion assembly comprises at least one motor and a battery power source that supplies electric power to said motor, wherein said propulsion assembly is disposed at a rear portion of said non-driving module and is configured to provide propulsion, and wherein said propulsion assembly is operably configured with said vehicle control system of said driving module.

21. A method of automated coupling and configuration, operation, and an automated decoupling and deconfiguration of a multi-modular vehicle, comprising:
providing a multi-modular vehicle system comprising:
a driving module, comprising:
a vehicle structure and a body member;
an open rear-end body or a closed rear-end body;
a vehicle control system;
a safety monitoring control system configured for controlling vehicle operational features and functions;
an automated coupling and configuration system (ACCS);
two front wheels with adjustable suspensions communicably coupled with said automated coupling and configuration system (ACCS) disposed at a front portion of a vehicle platform of said driving module, wherein said two front wheels comprise a first wheel and a second wheel, wherein said first wheel is disposed on right side of said front portion of said vehicle platform of said driving module, and wherein said second wheel is disposed on left side of said front portion of said vehicle platform of said driving module;
said two front wheels operably configured with a propulsion assembly, wherein said propulsion assembly comprises a motor and a battery power source that supplies electric power to said motor, and wherein said propulsion assembly is disposed in said driving module and configured to provide propulsion thereof;
an adjustable and retractable third wheel communicably coupled with said automated coupling and configuration system (ACCS), wherein said adjustable and retractable third wheel is disposed at a center of a rear portion of said vehicle platform of said driving module, wherein said adjustable and retractable third wheel is configured to operably retract into a housing compartment, wherein said adjustable and retractable third wheel facilitates automated coupling and automated decoupling of said driving module and a plurality of interchangeable non-driving modules, and wherein said adjustable and retractable third wheel also facilitates independent operation of said driving module as a three-wheel vehicle when said driving module is not coupled to any of said plurality of interchangeable non-driving modules;
said plurality of interchangeable non-driving modules, wherein said plurality of interchangeable non-driving modules vary in size, function and capacity, wherein each of said plurality of interchangeable non-driving modules are configured to be coupled to said driving module, wherein said plurality of interchangeable non-driving modules comprise one of (a) an open front-end body disposed with a retractable or a removable door, and (b) a closed front-end body, wherein said driving module when coupled with any of said plurality of interchangeable non-driving modules transforms into a four wheel vehicle, wherein each of said plurality of interchangeable non-driving modules is communicably coupled with said automated coupling and configuration system (ACCS) in said driving module, and wherein each of said plurality of interchangeable non-driving modules comprise:
a vehicle structure and a body member;
at least one pair of wheels with adjustable suspensions communicably coupled with said automated coupling and configuration system (ACCS) in said driving module, wherein said at least one pair of wheels are disposed at a rear portion of a vehicle platform of said non-driving module, wherein one wheel of said at least one pair of wheels is disposed on left side of said rear portion of said vehicle platform of said non-driving module, and wherein another one of said at least one pair of wheels is disposed on right side of said rear portion of said vehicle platform of said non-driving module;
at least two adjustable and retractable parking support members communicably coupled with said automated coupling and configuration system (ACCS) in said driving module, wherein said at least two adjustable and retractable parking support members are operably coupled to a frame of said non-driving module at a front end thereof, wherein said parking support members are configured to traverse in an upwards and downwards direction, wherein said parking support members are configured to operably maintain a level orientation of said non-driving module upon being coupled with or de-coupled from said driving module, and wherein said at least two adjustable and retractable parking support members retract into a housing compartment when coupling and configuration process of said driving module and said non-driving module is completed;
a pair of longitudinal female couplers disposed in a longitudinal frame member of said vehicle platform of said driving module, wherein each of said longitudinal female couplers is configured with a locking mechanism communicably coupled with said automated coupling and configuration system (ACCS) in said driving module, wherein sensors are disposed at an inner end of each of said longitudinal female couplers, and wherein said sensors are communicably coupled with said automated coupling and configuration system (ACCS) in said driving module;
a pair of longitudinal male couplers with a rack gear disposed in a longitudinal frame member of said non-driving module, wherein each of said longitudinal male couplers is configured to move between a first position and a second position, wherein said rack gear is configured with a pinion gear of an actuator communicably coupled with said automated coupling and configuration system (ACCS) in said driving module; and
a plurality of sensors and/or cameras communicably coupled with said automated coupling and configuration system (ACCS) in said driving module, wherein said plurality of sensors are disposed at a plurality of positions on said driving module and said non-driving module;

said method of automated coupling and configuration process, comprising:
  initiating said automated coupling and configuration system (ACCS), wherein said initiation comprises a user activating said automated coupling and configuration system (ACCS) disposed on said driving module via a secured access;
  determining legitimacy of said coupling and configuration process with said non-driving module;
  receiving data from said sensors and/or cameras disposed in said driving module and said non-driving module, by said automated coupling and configuration system (ACCS);
  sending commands to adjust position of said driving module and said non-driving module, by said automated coupling and configuration system (ACCS), wherein said commands are sent to:
    an actuator of said adjustable and retractable third wheel disposed at said rear center portion of said driving module;
    an actuator of said pair of adjustable and retractable parking supporters disposed at said front portion of said non-driving module;
    actuators for said adjustable independent suspension systems for leveling and aligning said driving module and said non-driving module to allow said driving module and said non-driving module to be precisely coupled to each other;
    actuators of said pair of longitudinal male couplers disposed in said longitudinal frame member of said non-driving module, and moving said longitudinal male couplers from said first position to said second position within said pair of longitudinal female couplers disposed in said longitudinal frame member of said driving module;
  activating said locking mechanism after receiving signals from sensors disposed at inner ends of said longitudinal female couplers when said longitudinal male couplers touch said sensors disposed at said inner ends of said longitudinal female couplers;
  activating said body coupling system, wherein said automated coupling and configuration system (ACCS) sends commands to activate said plurality of body member fasteners operably coupled to said automated coupling and configuration system (ACCS), wherein said activating said body coupling system comprises:
    releasably securing and securely locking said plurality of male body member fasteners disposed on said body member of said non-driving module to said plurality of female body member fasteners disposed on said body member of said driving module, when said plurality of male body member fasteners touch sensors disposed at inner ends of said plurality of female body member fasteners;
  coupling and locking electric and electronic connections on said driving and said non-driving module, wherein said electric and electronic connections are communicably coupled with said automated coupling and configuration system (ACCS) on said driving module;
  retracting said third wheel, wherein said third wheel disposed on said driving module is retracted into said housing compartment within said vehicle structure of said driving module; and
  retracting said parking support members, wherein said parking supporters disposed on said non-driving module are retracted into said housing compartments within said vehicle structure of said non-driving module;
said method of operation, comprising:
  adjusting and activating safety, monitoring, operational and control functions and features, wherein said safety, said monitoring, said operational and said control functions and features are adjusted and activated in accordance with specific type or model of said non-driving module coupled and configured with said driving module;
  adjusting said suspensions in said driving module and said non-driving module based on data collected by said sensors and/or cameras configured with said vehicle control system of said multi-modular vehicle based on specific type or model of non-driving module configured with said driving module, wherein said vehicle control system is configured to command adjustments of said suspensions in said driving module and said non-driving module based on data collected by said sensors and/or cameras;
said method of automated decoupling and deconfiguration process, comprising:
  initiating an automated coupling and configuration system (ACCS), wherein said initiation comprises said user activating said automated coupling and configuration system (ACCS) disposed on said driving module via a secured access;
  determining legitimacy, safety, and ground condition of a location for said decoupling and deconfiguration process based on data collected using a geolocation device configured with said automated coupling and configuration system (ACCS) disposed on said driving module;
  rejecting decoupling and deconfiguration procedures if said legitimacy, said safety, and said ground condition are determined as not favorable for said decoupling process;
  permitting decoupling and deconfiguration procedures if said legitimacy, said safety, and said ground condition are determined as favorable for said decoupling process;
  releasing said third wheel to a ground surface from said housing compartment in said vehicle structure of said driving module;
  releasing said pair of parking support members to said ground surface from said housing compartments in said vehicle structure of said non-driving module;
  unlocking and releasing said plurality of male body member fasteners from said plurality of female body member fasteners;
  unlocking and releasing said electric and said electronic connections;
  unlocking and releasing said longitudinal male couplers from said second position to said first position;
  closing front-end of said non-driving module with said retractable door or said removable door; and
  sending decoupling and deconfiguration completion signal to said vehicle control system on said driving module of said multi-modular vehicle.

* * * * *